US008855114B2

(12) United States Patent
Haigh et al.

(10) Patent No.: US 8,855,114 B2
(45) Date of Patent: Oct. 7, 2014

(54) VIRTUALIZED APPLICATION ACCELERATION INFRASTRUCTURE

(75) Inventors: Ronald E. Haigh, Highlands Ranch, CO (US); Nathaniel Jarrett Wilkes, Englewood, CO (US)

(73) Assignee: Virtela Technology Services Incorporated, Greenwood Village, CO (US)

( * ) Notice: Subject to any disclaimer, the term of this patent is extended or adjusted under 35 U.S.C. 154(b) by 579 days.

(21) Appl. No.: 12/844,050

(22) Filed: Jul. 27, 2010

(65) Prior Publication Data

US 2010/0290422 A1 Nov. 18, 2010

Related U.S. Application Data

(62) Division of application No. 12/236,895, filed on Sep. 24, 2008.

(60) Provisional application No. 60/977,324, filed on Oct. 3, 2007.

(51) Int. Cl.
H04L 12/28 (2006.01)
H04L 12/715 (2013.01)
H04L 12/713 (2013.01)
H04L 12/46 (2006.01)
H04L 12/725 (2013.01)

(52) U.S. Cl.
CPC .............. *H04L 45/306* (2013.01); *H04L 45/04* (2013.01); *H04L 45/586* (2013.01); *H04L 12/4641* (2013.01)
USPC .......................................... 370/392; 370/230

(58) Field of Classification Search
USPC .............. 370/230.1, 352, 392, 401, 473, 477, 370/329; 709/203, 228, 232, 246, 247, 222, 709/239
See application file for complete search history.

(56) References Cited

U.S. PATENT DOCUMENTS 6,496,847 B1 12/2002 Bugnion et al.
7,126,955 B2 10/2006 Nabhan et al.

(Continued)

FOREIGN PATENT DOCUMENTS

JP       2010541473 A    12/2010
WO   WO-2006078953 A2   7/2006
WO   WO-2009045299 A1   4/2009

OTHER PUBLICATIONS

U.S. Appl. No. 12/236,895, Restriction Requirement mailed Feb. 2, 2010, 8 pgs.

(Continued)

*Primary Examiner* — Dady Chery
(74) *Attorney, Agent, or Firm* — Schwegman Lundberg & Woessner, P.A.

(57) ABSTRACT

In one example embodiment, a system and method is illustrated that includes processes a first data packet using a first operating system, the first data packet received from a first network. A second operation is shown that processes a second data packet using a second operating system, the second data packet received from a second network. Further, an additional operation is shown that determines a route associated with the first data packet and the second data packet, the route including at least one of a logical route or physical route. Moreover, an operation is shown that parses the first data packet into at least one first logical segment, and parsing the second data packet into at least one second logical segment. An operation is shown that transmits the first logical segment and the second logical segment as at least one data packet across the WAN.

19 Claims, 19 Drawing Sheets

(56) References Cited

U.S. PATENT DOCUMENTS

| | | | |
|---|---|---|---|
| 7,286,476 B2 * | 10/2007 | Helmy et al. ............... | 370/230.1 |
| 7,428,573 B2 | 9/2008 | McCanne et al. | |
| 7,554,994 B1 * | 6/2009 | Puon et al. .................... | 370/401 |
| 2003/0037165 A1 | 2/2003 | Shinomiya | |
| 2005/0144282 A1 | 6/2005 | Argo | |
| 2006/0221960 A1 | 10/2006 | Borgione | |
| 2007/0192329 A1 | 8/2007 | Croft et al. | |
| 2007/0192863 A1 | 8/2007 | Kapoor et al. | |
| 2007/0198656 A1 | 8/2007 | Mazzaferri et al. | |
| 2009/0059914 A1 * | 3/2009 | Khalid et al. ................. | 370/389 |
| 2009/0092137 A1 | 4/2009 | Haigh et al. | |
| 2009/0300605 A1 | 12/2009 | Edwards et al. | |
| 2011/0153793 A1 | 6/2011 | Tan | |

OTHER PUBLICATIONS

International Application Serial No. PCT/US2008/11049, Search Report mailed Nov. 26, 2008, 4 pgs.

International Application Serial No. PCT/US2008/11049, Written Opinion mailed Nov. 26, 2008, 3 pgs.

WANJet(r) Series—Wan Optimization Platform, (c) 2007 FS Networks, Inc., (2007), 2 pgs.

U.S. Appl. No. 12/236,895, Final Office Action mailed Jan. 9, 2012, 16 pgs.

U.S. Appl. No. 12/236,895, Final Office Action mailed Aug. 20, 2010, 10 pgs.

U.S. Appl. No. 12/236,895, Final Office Action mailed Apr. 13, 2011, 10 pgs.

U.S. Appl. No. 12/236,895, Non Final Office Action mailed Jul. 28, 2011, 10 pgs.

U.S. Appl. No. 12/236,895, Response filed Jan. 19, 2011 to Non Final Office Action mailed Aug. 20, 2010, 7 pgs.

U.S. Appl. No. 12/236,895, Response filed Jul. 13, 2011 to Final Office Action mailed Apr. 13, 2011, 7 pgs.

U.S. Appl. No. 12/236,895, Response filed Jul. 27, 2010 to Restriction Requirement mailed Feb. 2, 2010, 5 pgs.

U.S. Appl. No. 12/236,895, Response Filed Nov. 28, 2011 to Non-Final Office Action Received Jul. 28, 2011, 7 pgs.

European Application Serial No. 08835474.1, Office Action Response filed Mar. 15, 2012, 8 pgs.

European Patent Application Serial No. 08835474.1—Extended EP Search Report mailed Jul. 19, 2011, 5 pgs.

International Application Serial No. PCT/US2008/011049, International Preliminary Report on Patentability mailed Apr. 7, 2010, 5 pgs.

U.S. Appl. No. 12/236,895, Non Final Office Action mailed Nov. 21, 2012, 16 pgs.

U.S. Appl. No. 12/236,895, Response filed Jun. 11, 2012 to Final Office Action mailed Jan. 9, 2012, 9 pgs.

International Application Serial No. PCT/US2008/011049, Article 19 Amendment filed Jan. 26, 2009, 7 pgs.

Japanese Application Serial No. 2010-527947, Office Action mailed Mar. 15, 2013, With English Translation, 17pgs.

\* cited by examiner

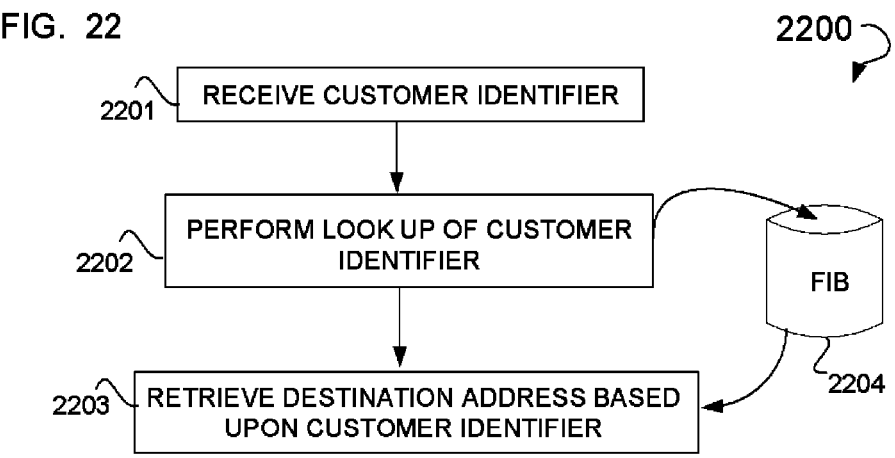
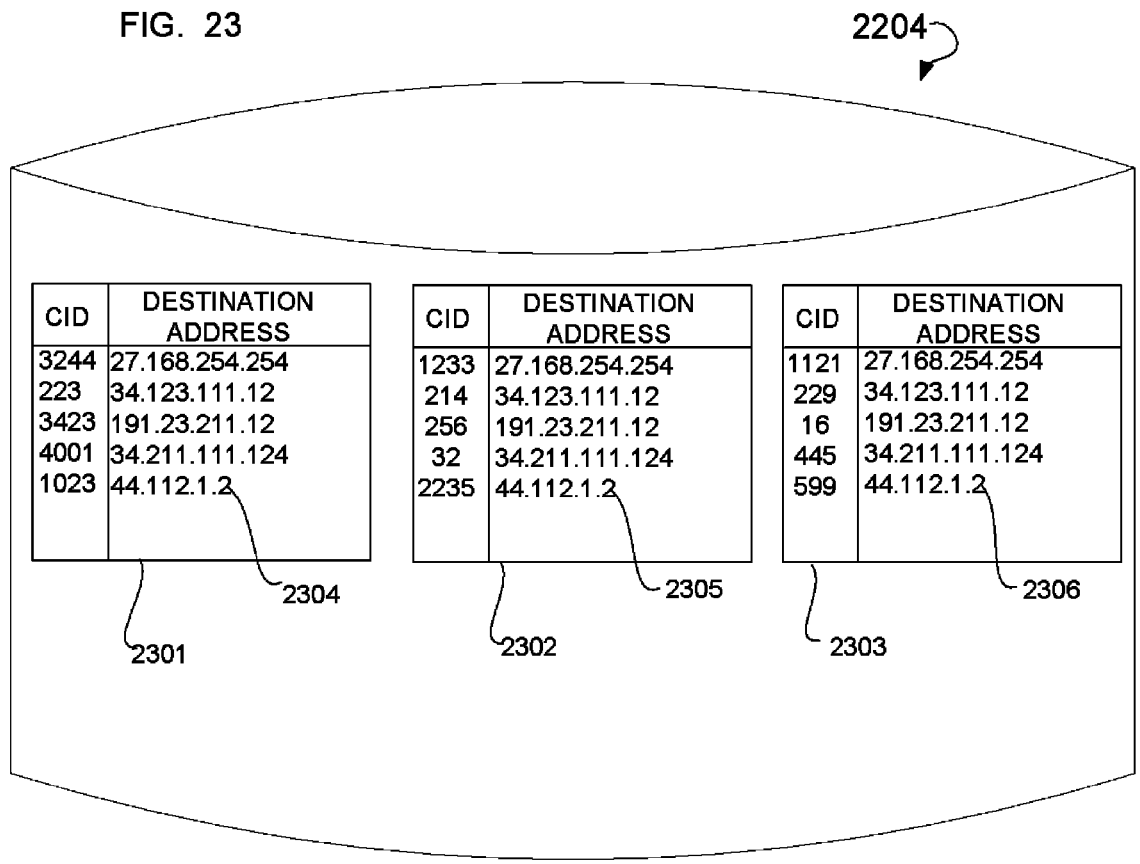

VIRTUALIZED APPLICATION ACCELERATION INFRASTRUCTURE

CROSS REFERENCE TO RELATED APPLICATIONS

This application is a divisional of U.S. patent application Ser. No. 12/236,895 filed on Sep. 24, 2008, which is a nonprovisional patent application claiming priority under 35 USC §119(e) to U.S. Provisional Patent Application Ser. No. 60/977,324 filed on Oct. 3, 2007, which applications are incorporated herein by reference in their entirety.

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Virtela Communications, Incorporated. All Rights Reserved.

TECHNICAL FIELD

The present application relates generally to the technical field of network routing and, in one specific example, the use of network traffic routing methods and apparatus.

BACKGROUND

In computer systems, virtualization allows for multiple versions of the same application to use computer system resources in a manner such that these resources are efficiently shared. These resources include, for example, disk space, processor cycles and other suitable information. Virtualization allows for robust and scaleable computer systems to be developed.

BRIEF DESCRIPTION OF THE DRAWINGS

Some example embodiments are illustrated by way of example and not limitation in the figures of the accompanying drawings in which:

FIG. 22 is a flowchart illustrating a method, according to an example embodiment, used to perform a lookup of a destination address.

FIG. 23 is a diagram illustrating a Forwarding Information Base (FIB), according to an example embodiment, and the various routing tables included therein.

DETAILED DESCRIPTION

Figure 1:
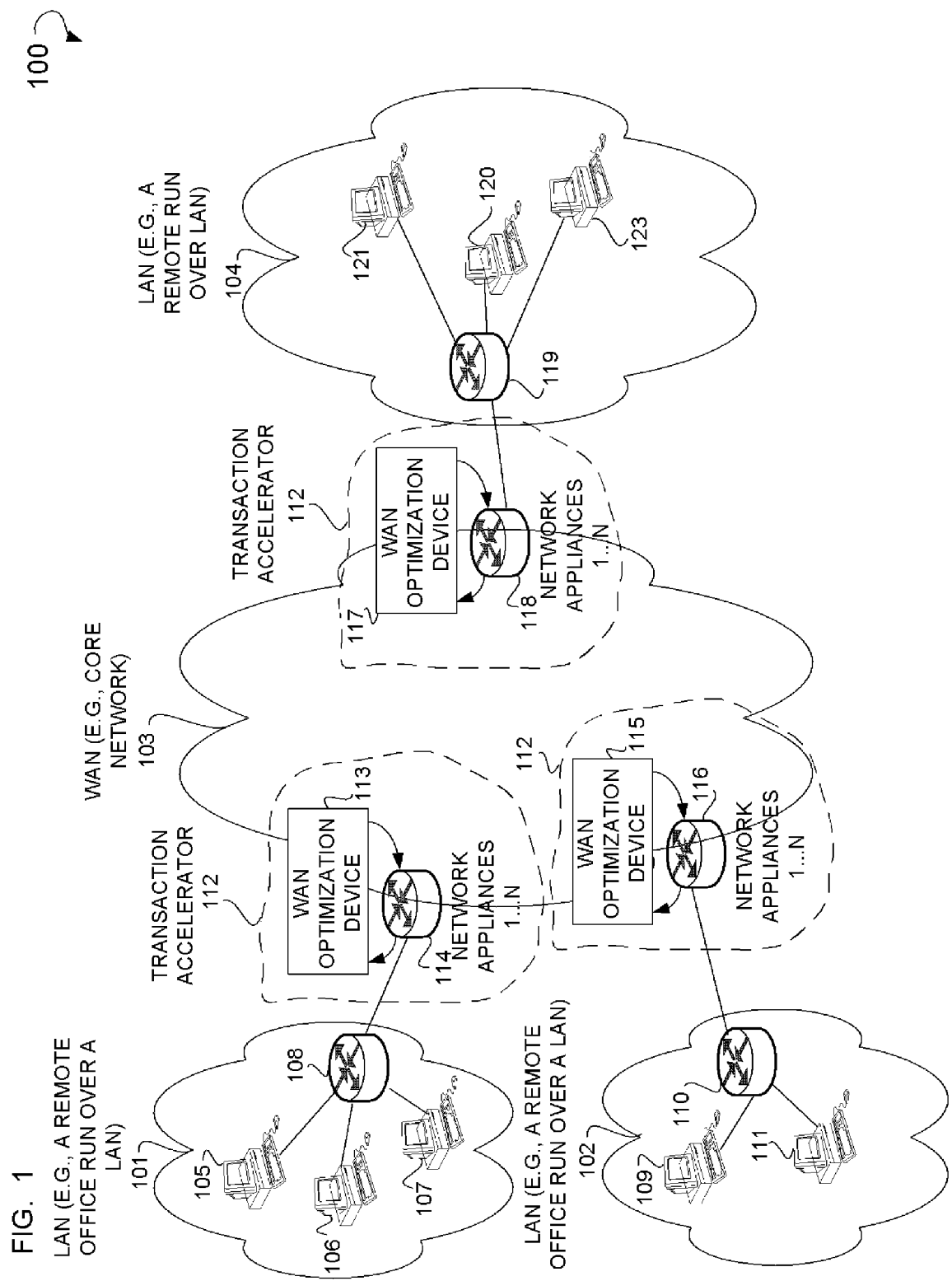
FIG. 1 is a diagram of a system, according to an example embodiment, illustrating the use of remotely placed transaction accelerators, where these transaction accelerators provide a gateway to a WAN.

In some example embodiments, a system and method is illustrated that allows for the remote placement of a transaction accelerator to service one or more Local Area Networks (LAN). This transaction accelerator, in some example embodiments, may include a WAN optimization device, a network appliance, and a physical or logical connection between the WAN optimization device and the network appliance. Some example embodiments may include the network appliance being a switch, bridge, router, or some other suitable layer 2 or layer 3 capable device. In some example embodiments, the network appliance is a PE router. Further, layer 2 or layer 3 may refer to layers or levels as defined within the Open Systems Interconnection (OSI) basic reference model or Transmission Control Protocol/Internet Protocol (TCP/IP) protocol stack model. In some example embodiments, this physical or logical connection are able to support a Virtual Local Area Network (VLAN), and utilize the 802.1Q standard, or some other suitable network segmentation standard.

Some example embodiments may include the use of the WAN optimization device to service multiple client LANs. The WAN optimization device is a computer system implementing one or more of a variety of virtualization regimes including paravirtualization, a virtual machine, or virtualization on an OS level. Through implementing one or more of these virtualization regimes, the resources of the computer system may be efficiently divided between client LANs. These computer system resources include, for example, disk quota requirements, Input/Out (I/O) rate limits, memory limits, CPU quotas, or efficient use of network interfaces. A plurality of OSs (collectively referenced as virtualized OSs) may be executed on the computer system such that each OS utilizes computer system resources specifically allocated for its use. Each one of these OSs may be exclusively utilized by a specific client LAN and dedicated for such purpose. In one example embodiment, one of these virtualized OSs residing on the computer system exclusively manages one or more network appliances. These managed network appliances may themselves be real, in terms of being a separate physical device, or may reside as another application on the computer system along with the virtualized OSs.

In certain example embodiments, no virtualization is used by the computer system running the WAN optimization engine; rather, a series of dedicated computer systems is implemented. Each of these computer systems may be dedicated to serve a particular LAN. Further, each of these computer systems may utilize a specific network appliance such as a PE during the course of serving the particular LAN.

In some example embodiments, the concept of virtualization is applied in the network setting such that a single computer system implementing virtualized OSs manages network traffic for multiple client LANs. VLAN, and its associated technologies, is a technology that allows for a single physical network to be partitioned into a plurality of VLANs. Each of these VLANs, in turn, may service a particular client LAN. In one example embodiment, a VLAN header is applied to a TCP/IP based data packet by the WAN optimization device. This VLAN header includes a uniquely identifying VLAN ID that identifies the TCP/IP based data packet as being destined for transmission to a particular client LAN.

Some example embodiments may include the use of a virtualized OS to manage network traffic for a particular client LAN, where this management includes the use of VLAN technology. Through virtualization of the OS and network traffic via VLAN, not only may the computer system resources be efficiently used, but network resources may be efficiently used. Specifically, through using VLAN in conjunction with Virtual Routing and Forwarding (VRF), address space within a network may be allowed to overlap. The VRF address space is included in a VRF table, and/or a Forwarding Information Base (FIB) table associated with the VRF or VRF table. Overlapping address space allows for duplicate addresses to be used within the same physical environment.

In one example embodiment, this transaction accelerator is remotely located from a client LAN, and services this client LAN by providing a gateway to a WAN (e.g., core network) and to additional LANs of the client. The WAN optimization device is operatively connected (e.g., logically or physically connected) to a PE router, where this PE router receives network traffic (e.g., the afore referenced TCP/IP data packets) from one or more Customer Edge (CE) routers. Using virtualized OSs and VLAN technology, this network traffic is segregated, and, in some cases, relabeled with additional headers (e.g., VLAN headers and/or MultiProtocol Label Switching (MPLS)). Once segregated, the network traffic is transmitted to a destination client LAN. For example, a client LAN in the form of a data center run over a LAN, may transmit data over the WAN to another client LAN in the form of an office located remotely from the data center.

Additionally, in some example embodiments, a plurality of transaction accelerators is implemented such that a first transaction accelerator exchanges data with a second transaction accelerator. The first transaction accelerator serves as a gateway to a WAN for one or more LANs, while the second transaction accelerator may serve as a gateway to a WAN for one or more different LANs. Data traffic routed into the WAN (e.g., a data packet) may be optimized by the WAN optimization device residing as part of the first transaction accelerator. This optimization may take the form of compressing the data, caching the data, tunneling the data, modifying the TCP/IP window size, providing local TCP acknowledgements, or perform some other suitable optimization technique on the data. Once optimized, the data may be transmitted by the first transaction accelerator to the second transaction accelerator which is located on the remote side of the WAN.

FIG. 1 is a diagram of example system 100 illustrating the use of remotely placed transaction accelerators, where these transaction accelerators provide a gateway to a WAN. Shown is a LAN 101, a LAN 102, and a LAN 104. Each one of these LANs is served by a WAN 103 acting as a core network. Each of these LANs 101, 102, and 104 include a number of network appliances and computer systems. With regard to LAN 101, LAN 101 includes a network device in a form of a CE router 108. This CE router 108 serves a computer system 105, a computer system 106, and a computer system 107. Each of these computer systems 105-107 and CE router 108 reside within the LAN 101. With regard to the LAN 102, LAN 102 includes a CE router 110. This CE router 110 serves a computer system 109 and computer system 111, both of which also reside within the LAN 102. This LAN 101 and LAN 102 are, in turn, served by the WAN 103. Included within this WAN 103 is a plurality of transaction accelerators 112. In some example embodiments, only one transaction accelerator is used to serve one or more LANs.

Some example embodiments may include each one of these transaction accelerators including a WAN optimization device which serves one or more network appliances. In one example embodiment, the transaction accelerator 112 includes a WAN optimization device 113 and one or more network appliances 114. This network appliance 114 is, for example, a PE router. Further, in another example embodiment of the transaction accelerator 112, the transaction accelerator 112 includes a WAN optimization device 115 that serves one or more network appliances 116. This network appliance 116 is a PE router. A further transaction accelerator 112 includes a WAN optimization device 117 that, in turns, serves a network appliance 118. This network appliance 118 is a PE router. This WAN 103 also serving the LAN 104, in addition to the LANs 101 and 102. The LAN 104 may include a CE router 119 that, in turns, serves a computer system 120, 121 and 123, all of which reside within the LAN 104.

In some example embodiments, as will be more fully discussed below, the LAN 101 and 102, and computer systems and network appliances included therein, transmit data across the WAN 103 utilizing one or more of the transaction accelerators 112. These transaction accelerators 112 may then, in turn, forward the data transmitted by these various computer systems residing within the LAN 101 and 102 to the LAN 104 and the various computer systems residing therein (e.g., computer systems 120, 121 and 123).

In some example embodiments, the transaction accelerator is kept at a different physical location than devices and network that makes up the LANs 101, 102, and 104. Specifically, the transaction accelerator 112 is kept at a location that is physically remote from the location of the LANs. For example, the transaction accelerator 112 is kept at a network service center that is physically remote from the physical locations of the LANs such that a plurality of LANs may be serviced by one service center including at least one transaction accelerator 112.

Figure 2:
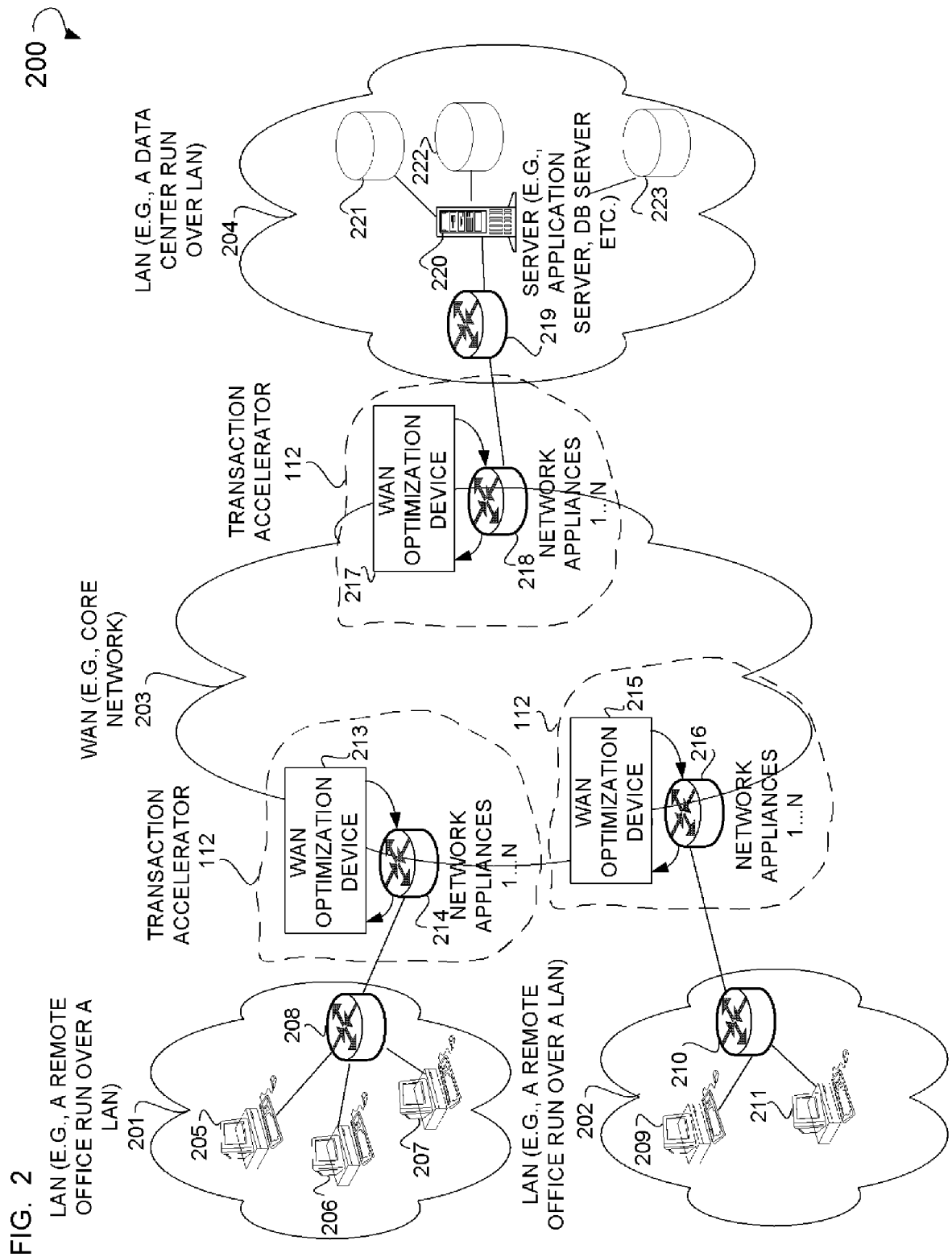
FIG. 2 is a diagram of a system, according to an example embodiment, illustrating the use of a Local Area Network (LAN) to service a data-center where this data-center is run over the LAN.

FIG. 2 is a diagram of an example system 200 illustrating the use of a LAN 204 to service a data-center where this data-center is run over the LAN 204. Illustrated is a LAN 201 including a computer system 205, 206 and 207, each of which is serviced by a CE router 208. Further, a LAN 202 is shown including a computer system 209 and 211, each of which is served by a CE router 210. Each of these LANs 201 and 202 are, in turn, serviced by one or more transaction accelerators 112 that reside as a part of a WAN 203. A plurality of transaction accelerators 112 is used to service the LAN 201, 202 and the various computer systems and routers (e.g., CE router 208 and CE router 210) that reside therein.

For example, in one embodiment, a transaction accelerator 112 may include a WAN optimization device 213 that is used to service one or more network appliances 214. Further, in another example embodiment, the transactions accelerator 112 may include a WAN optimization device 215 that is used to service one or more network appliances 216. In some example embodiments, the transaction accelerator 112 may include a WAN optimization device 217 that is used to service a network appliance 218. As with FIG. 1 the various transaction accelerators illustrated herein may reside as a part of the WAN 203, and hence are located remotely from the various LANs (e.g., LAN 201, LAN 202 and LAN 204).

Additionally illustrated in FIG. 2 is a CE router 219 that resides as a part of the LAN 204 where the CE router 219 services a server 220 that in turn runs or accesses a number of databases 221, 222, and 223. The various computer systems located within the LAN 201, and/or LAN 202 may utilize the WAN 203, and transaction accelerators 112 residing therein, to request data from the LAN 204 and the data center included therein. This data, in turn, is transmitted over the WAN 203 to be received by the LAN 201, where the LAN 202 and the CE router(s) (e.g., CE router 208 and CE router 210) resides as a part of these two LANs 201 and 202. As will be described more fully below, a variety of architectures may be used to build a transaction accelerator 112.

Figure 3:
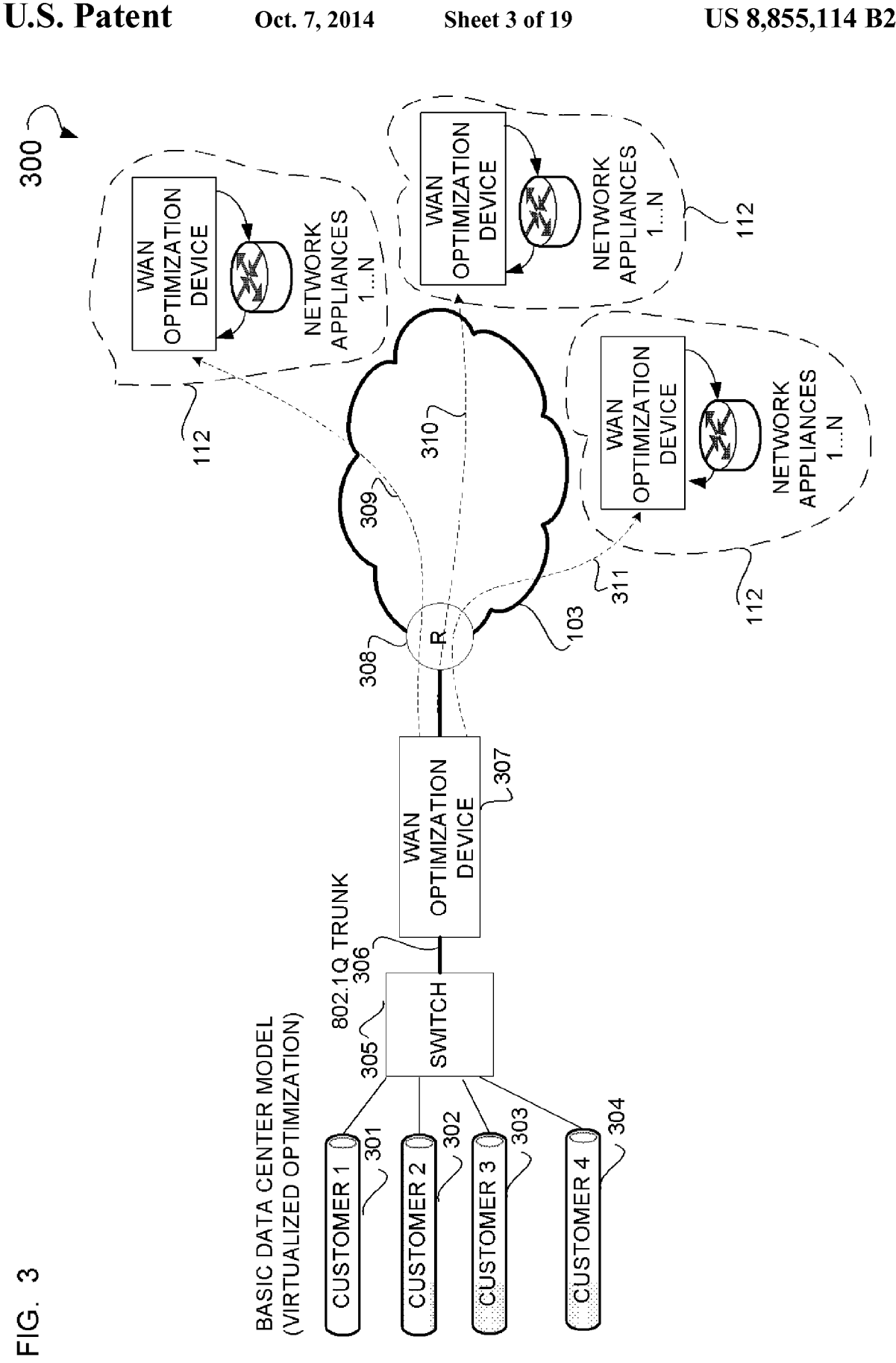
FIG. 3 is a diagram of a system, according to an example embodiment, illustrating the transmission path of data across a WAN from a virtualized WAN Optimization device servicing a plurality of Customer LANs to a corresponding series of WAN Optimization devices.

FIG. 3 is a diagram of an example system 300 illustrating the transmission path of data across a WAN 103. Shown is a basic data-center model including a number of customer environments. A customer environment may be hardware dedicated to the needs of a specific customer. These customer environments may send and receive data in the form of data packets (e.g., TCP/IP formatted data packets) to be further formatted using VLAN. For example, a customer 1 environment 301 is shown, as is a customer 2 environment 302, a customer 3 environment 303 and a customer 4 environment 304. These environments may provide data to the WAN 103 where this data is uniquely identified thru some type of numeric reference residing as a part of some type of protocol. This protocol may include, for example, IP, a VLAN protocol, or some other suitable protocol.

Some example embodiments may include one or more of these customer environments (e.g., 301-304) providing data to, for example, a switch 305 where the switch 305 is a layer 2 or layer 3 switch as understood in terms of the TCP/IP stack model or the OSI model. This switch 305 may then use, for example, an 802.1Q trunk 306 to provide segmentation for all customer traffic (e.g., as a data packet) between the switch 305 and a WAN optimization device 307. This 802.1Q trunk 306 may convert, transform, or add an additional header to the data packets coming in from the customer environments 301 through 304. This header that is added to a VLAN header and associated VLAN Identifier (ID), wherein this VLAN ID may serve to uniquely identify each one of these packets and their particular recipients. Once these packets are received by the WAN optimization device 307, the WAN optimization device 307 may process and then wrap or otherwise packetize these data packets using VLAN, and transmit these packets to a router such as router 308. This router 308 may additionally packetize or wrap these packets using some type of physical layer or link-layer protocol. These packets may then be sent to additional transaction accelerator devices 112 for further processing. Further, the previously referenced switch 305, 802.1Q trunk 306, and WAN optimization device 307, as well as the router 308, may reside as a part of the WAN 103. Each one of these separate components (e.g., switch 305, 802.1Q trunk 306, WAN optimization device 307 and the router 308) may be collectively understood to form a single transaction accelerator 112.

In some example embodiments, the data packets is optimized by the WAN optimization device 307. For example, as illustrated herein, the optimized data packets is tunneled and transmitted along routes 309-311 to one or more receiving transaction accelerators 112. Once received, these receiving transaction accelerators 112 may further process the data packets for transmission to one or more LANs.

Figure 4:
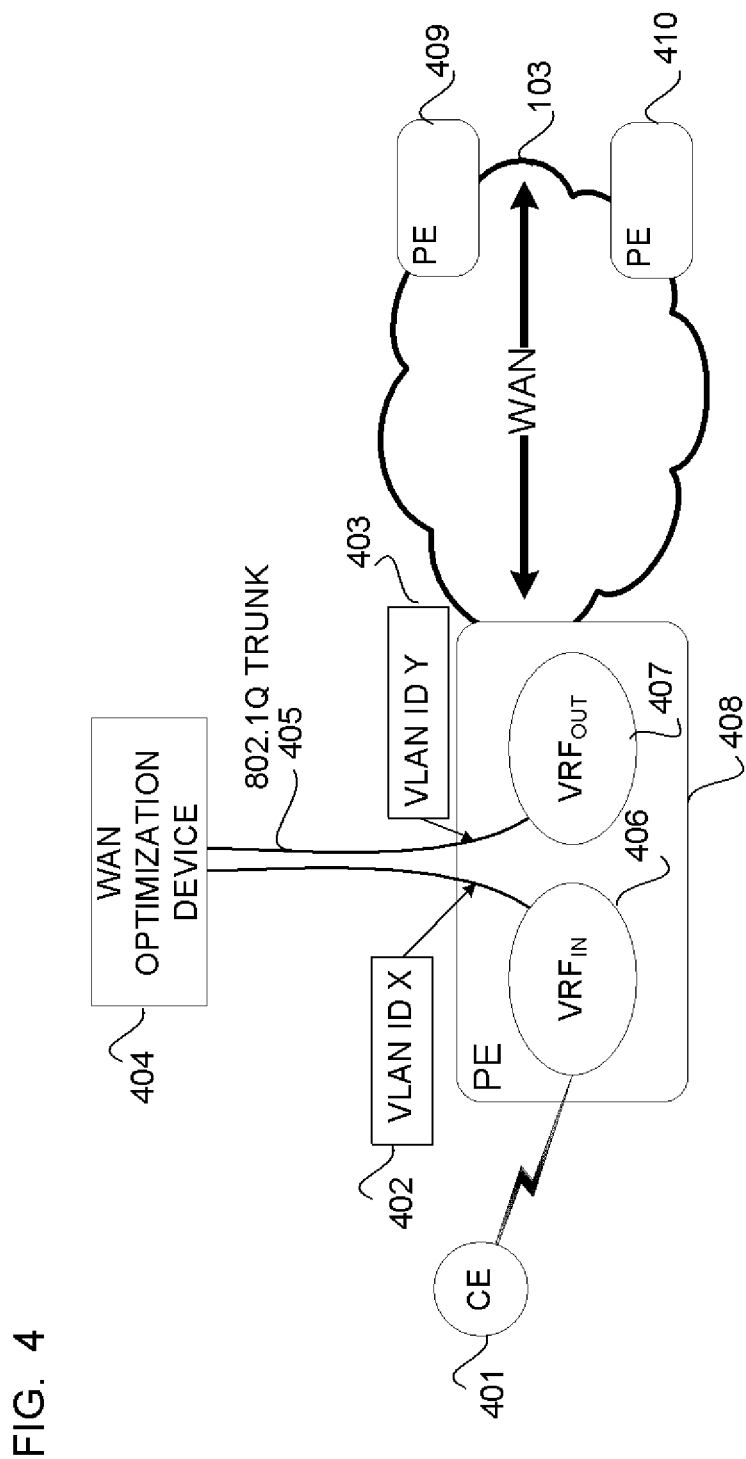
FIG. 4 is a diagram of an architecture, according to an example embodiment, for a transaction accelerator, wherein this architecture involves the use of a single physical connection between a WAN optimization device and a network appliance.

FIG. 4 is a diagram of an example architecture for a transaction accelerator 112, where this architecture involves the use of a single physical connection between a WAN optimization device and a network appliance. This network appliance is depicted as a PE router that uses a 802.1Q trunk. Shown is a CE router 401 that transmits a data packet across some type of network connection to a PE router 408. Residing as a part of this PE router 408 may be a VRF in table 406. Once this data packet is received and buffered, a look up of a destination address included within the VRF in table 406 may occur based upon information taken from a header in the data packet. A VLAN header including a VLAN ID may then be attached to the data packet based upon the lookup results. Specifically, a VLAN ID X 402 module may affix a VLAN ID as a part of a generalized VLAN packet header to the data packet. This destination address may be an IP address or some other suitable address. The VLAN ID X 402 module may reside as part of the PE router 408. The VLAN ID X 402 module may reside as part of a WAN optimization device 404.

Once this VLAN packet header is affixed to the data packets included in the VRFin 406 table, these data packets are then transmitted across a physical interface in the form of an 802.1Q trunk 405 to the WAN optimization device 404. The WAN optimization device 404 may optimize the data packet by, for example, compressing the data, caching the data, tunneling the data, modifying the TCP/IP window size, providing local TCP acknowledgements, or performing some other suitable optimization technique on the data. A further VLAN ID Y 403 module may be used to attach a second VLAN ID or otherwise to make this second VLAN ID a part of a new VLAN header. This VLAN ID Y 403 module may, in some example embodiments, reside as part of the PE router 408. The VLAN ID Y 403 module may reside as part of the WAN optimization device 404. Once the new VLAN header is attached, and the now optimized data packet is routed across the 802.1Q trunk 405 to the PE router 408, a further look up is conducted using the VRFout 407 table. The data packet may then, for example, be transmitted across the WAN 103 to be received by, for example, a PE router 409 or PE router 410. These PE routers 409 and 410 may themselves be part of an additional transaction accelerator 112, or plurality of transaction accelerators 112.

Figure 5:
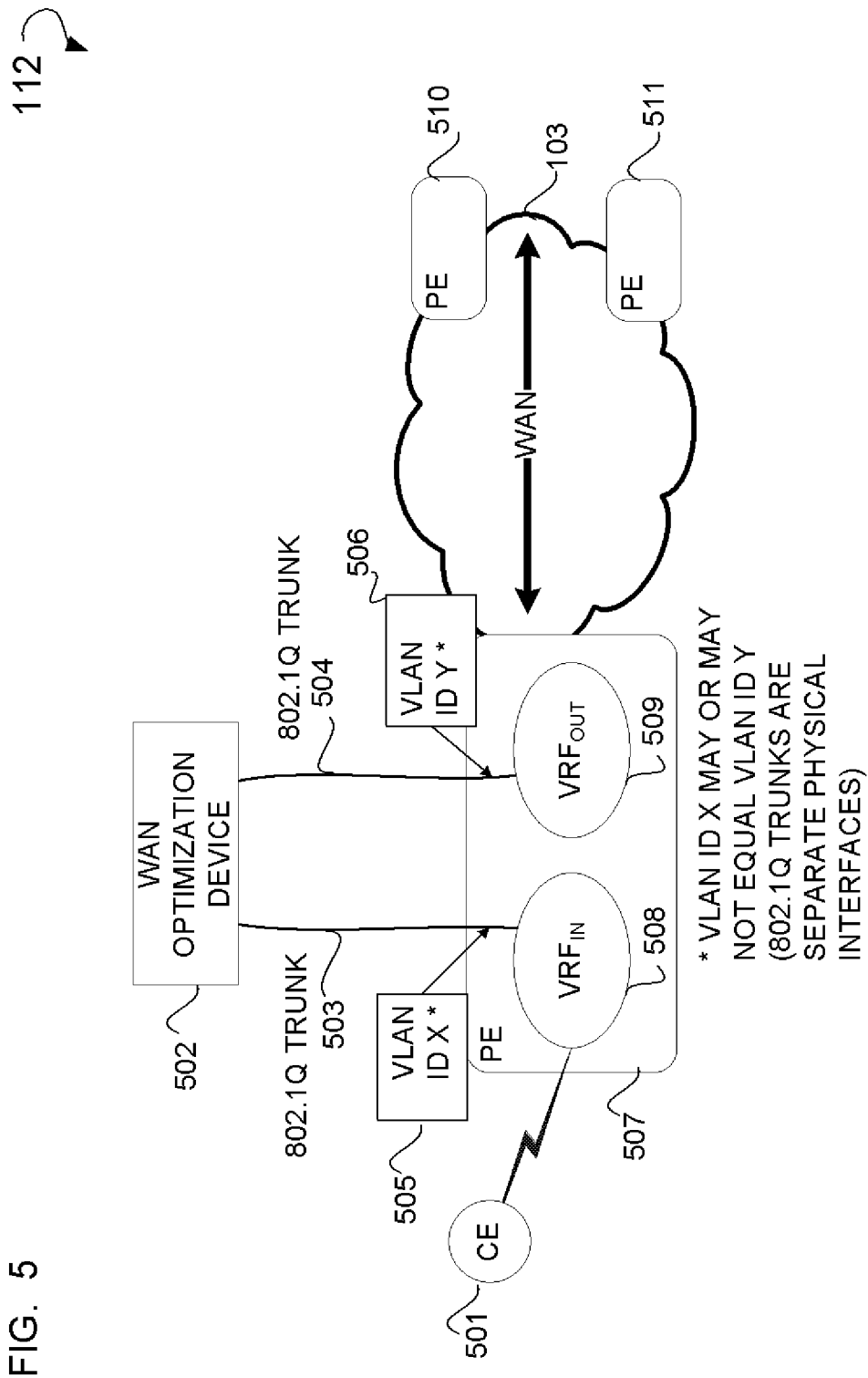
FIG. 5 is a diagram of an architecture, according to an example embodiment, for a transaction accelerator, wherein this architecture includes the use of two physical connections between a WAN optimization device and a network appliance.

FIG. 5 is a diagram of an example architecture for a transaction accelerator 112 where this example architecture includes the use of two physical interfaces between a WAN optimization device 502 and a network appliance (e.g. PE router 507). Shown is a CE router 501 that transmits a data packet across the network to a PE router 507. The data packet is formatted using a TCP/IP header. Residing as a part of this PE router 507 is a VRFin table 508 and VRFout table 509. Connected to this PE router 507 is a WAN optimization device 502, where the connection is a physical interface and accompanying 802.1.Q trunk 503 and a second physical interface and accompanying 802.1.Q trunk 504. Data packets flow into the WAN optimization device 502 via the 802.1.Q trunk 503, and flow out of the WAN optimization device 502 via the 802.1.Q trunk 503.

In one example embodiment, once the data packet is received by the PE router 507, a lookup of a destination address is conducted by the PE router 507 using the VRFin table 508. A VLAN ID X 505 module may be executed that affixes a VLAN header to the data packet, after the destination address is determined. This VLAN header may include a VLAN ID that may uniquely identify the recipient of the data packet. This data packet is then provided to, for example, the WAN optimization device 502. This WAN optimization device 502 may then optimize the data packet by, for example, tunneling it, compressing it, or caching it. This WAN optimization device 502 may then transmit the data packet using the 802.1Q trunk 504. A new VLAN header and VLAN ID may then be applied to the now optimized data packet using a VLAN ID Y 506 module prior to transmission along the 802.1Q trunk 504. In other cases, the data packet may not be formatted using a new VLAN ID, but rather will retain the previously utilized VLAN ID and associated VLAN header assigned by the VLAN ID X 505 module. Once the data packet is received by the PE router 507, a lookup may occur using the VRFout table 509 to determine a destination address. The data packet may be transmitted across the WAN 103 to be received by a PE router 510 and/or PE router 511, where these PE routers may themselves be part of an additional transaction accelerator 112, or plurality of transaction accelerators 112.

Figure 6:
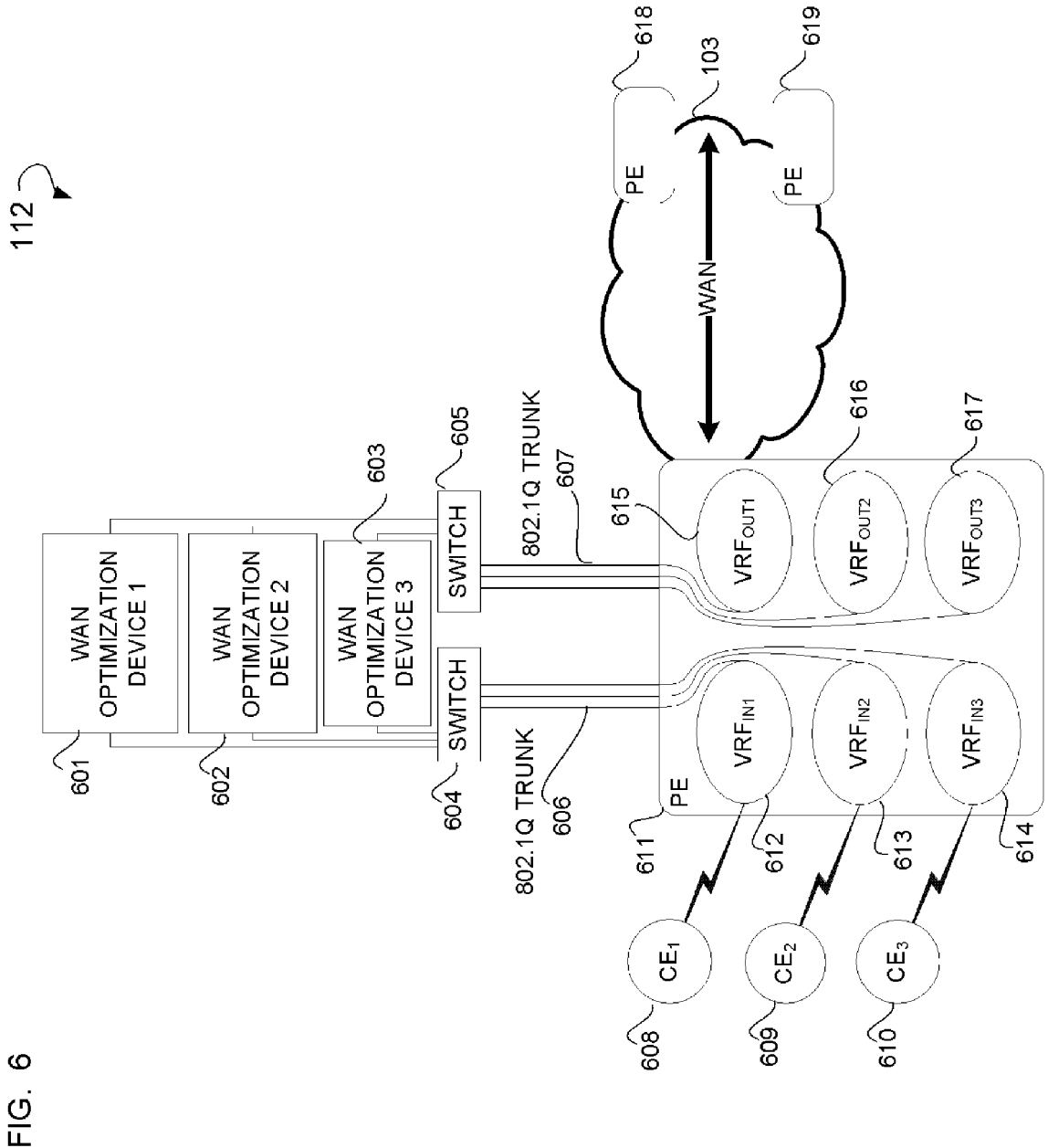
FIG. 6 is a diagram of an architecture, according to an example embodiment, for a transaction accelerator, wherein this transaction accelerator services a plurality of network appliances.

FIG. 6 is a diagram of an example architecture for a transaction accelerator 112, where this transaction accelerator 112 services a plurality of network appliances. Shown are a CE routers 608, 609 and 610 that route data packets to, for example, a PE router 611. These data packets are formatted using, for example, an TCP/IP header. Residing as a part of this PE router 610 is a plurality of VRFin tables such as, for example, VRFin table 612, VRFin table 613, and VRFin table 614. Each of these VRFin tables 612-614 are dedicated to each of the CEs routers 608-610 respectively (e.g., CE router 608 maps to VRFin 612, CE router 609 maps to VRFin router 613, etc.). Further, shown is a plurality of VRFout tables such as, for example, VRFout table 615, VRFout table 616, and VRFout table 617. Operatively connected to each one of these VRFin tables (e.g., 612, 613 and 614) and further operatively connected to these various VRFout tables (e.g., 615, 616 and 617) are a number of VLAN interfaces aggregated into 802.1Q trunks 606 and 607. Managing the traffic for these 802.1Q trunks 606 and 607 is a switch 604 and 605. The switch 604 and 605 guide data packets to, for example, a plurality of WAN optimization devices. These WAN optimization devices include, for example, WAN optimization device 1 601, WAN optimization 2 602, and WAN optimization device 3 603. The switch 605 manages data packets flowing from each of these WAN optimization devices 601, 602, and 603 across the 802.1.Q trunk 607 to the PE router 611.

In one example embodiment, a data packet transmitted by, for example, the CE router 608 is received by the PE router 611. A look up is performed using the VRFin table 612. Further, a VLAN header is affixed to this data packet based upon the lookup results, and the data packet including the VLAN header is transmitted along the 802.1Q trunk 606 to be received by, for example, the switch 604. Once received by the switch 604, this data packet including the VLAN header is then routed to one of the WAN optimization devices 601-603 each dedicated to serve data traffic sourced by or destined to the LANs served by CE 608-610 respectively. When received at one of these WAN optimization devices 601-603, the data packet including the VLAN header is optimized. This optimization may take the form of compressing the data included in the data packet, caching the data in the data packet, tunneling the data in the data packet, modifying the TCP/IP window size, providing local TCP acknowledgements, or performing some other suitable optimization technique on the data. The now optimized data packet is then sent to the switch 605 for routing to the PE router 611 via the 802.1.Q trunk 607. In some example cases, prior to this routing, a new VLAN header is associated with the data packet. Once received by the PE router 611, a destination address look-up is performed using one of the VRFout tables 615-617 each associated to a 802.1 Q VLAN that provides the connectivity to one of the dedicated WAN optimization devices 601-603. Once this destination address is looked up in the VRF, then the packet may be transmitted across the WAN 103 to be received by, for example, the PE router 618 and/or PE router 619. These PE routers 618 and 619 may themselves be part of an additional transaction accelerator 112, or a plurality of transaction accelerators 112.

Figure 7:
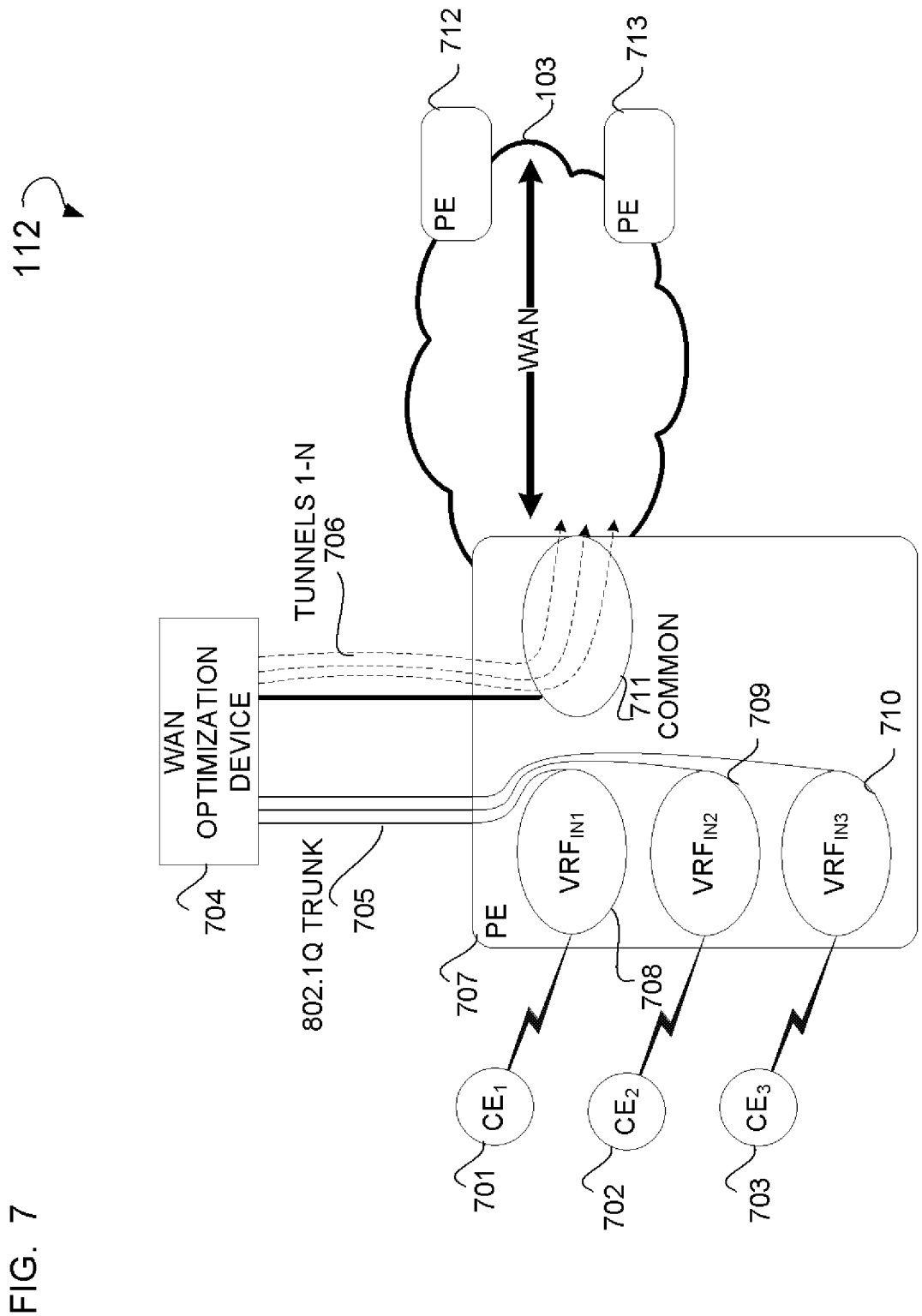
FIG. 7 is a system diagram illustrating a architecture, according to an example embodiment, for a transaction accelerator, wherein a common logical Virtual Routing and Forwarding (VRF) table is utilized.

FIG. 7 is a system diagram illustrating an example architecture for a transaction accelerator 112 where a common logical VRF table is utilized. Shown is a CE router 701, a CE router 702 and a CE router 703 that transmit one or more data packets to a PE router 707. Residing as a part of this PE router 707 is a VRFin table 708, a VRFin table 709 and a VRFin table 710. Also residing as a part of this PE router 707 is a common logical VRF table 711. Operatively connected to this PE router 707, via one or more physical interfaces, is a WAN optimization device 704. This WAN optimization device 704 is connected via, for example, an 802.1Q trunk 705.

In one example embodiment a data packet is transmitted by, for example, a CE router 701 to be received by the PR router 707. This data packet may be formatted using TCP/IP. A lookup of a destination address may be performed using the VRFin table 708 and the TCP/IP header data included within the data packet. A VLAN header may then be affixed to the data packet. This data packet is transmitted along the 802.1Q trunk 705 to be received by the WAN optimization device 704. The WAN optimization device 704 may optimize the data packet by, for example, compressing the data included in the data packet, caching the data in the data packet, tunneling the data in the data packet, modifying the TCP/IP window size, providing local TCP acknowledgements, or performing some other suitable optimization technique on the data. The data packet may not be optimized where the route to the destination address is not known by the WAN optimization device 704. The WAN optimization device 704 may utilize one or more dedicated tunnels 706, where these tunnels may be some type of protocol based wrapper or other way to further uniquely identify the now optimized data packet for a specific destination address. Tunneling may include wrapping the data packet in a header in a form of, for example, an Generic Route Encapsulation (GRE) tunnel, Internet Protocol Security (IPSEC) tunnel, or MPLS header. In such cases, a tunnel shall be dedicated to a particular client LAN to provide the segmentation of traffic from multiple client LANs. The data packet may be transmitted by the WAN optimization device 704 to the PE router 707. The PE router 707 may perform a lookup of a destination address using the common logical VRF table 711. The optimized and tunneled data packet may be forwarded across for example, the WAN 103 to, for example, a PE router 712 or a PE router 713. These PE routers 712 and 713 may themselves be part of an additional transaction accelerator 112, or plurality of transaction accelerators 112.

Figure 8:
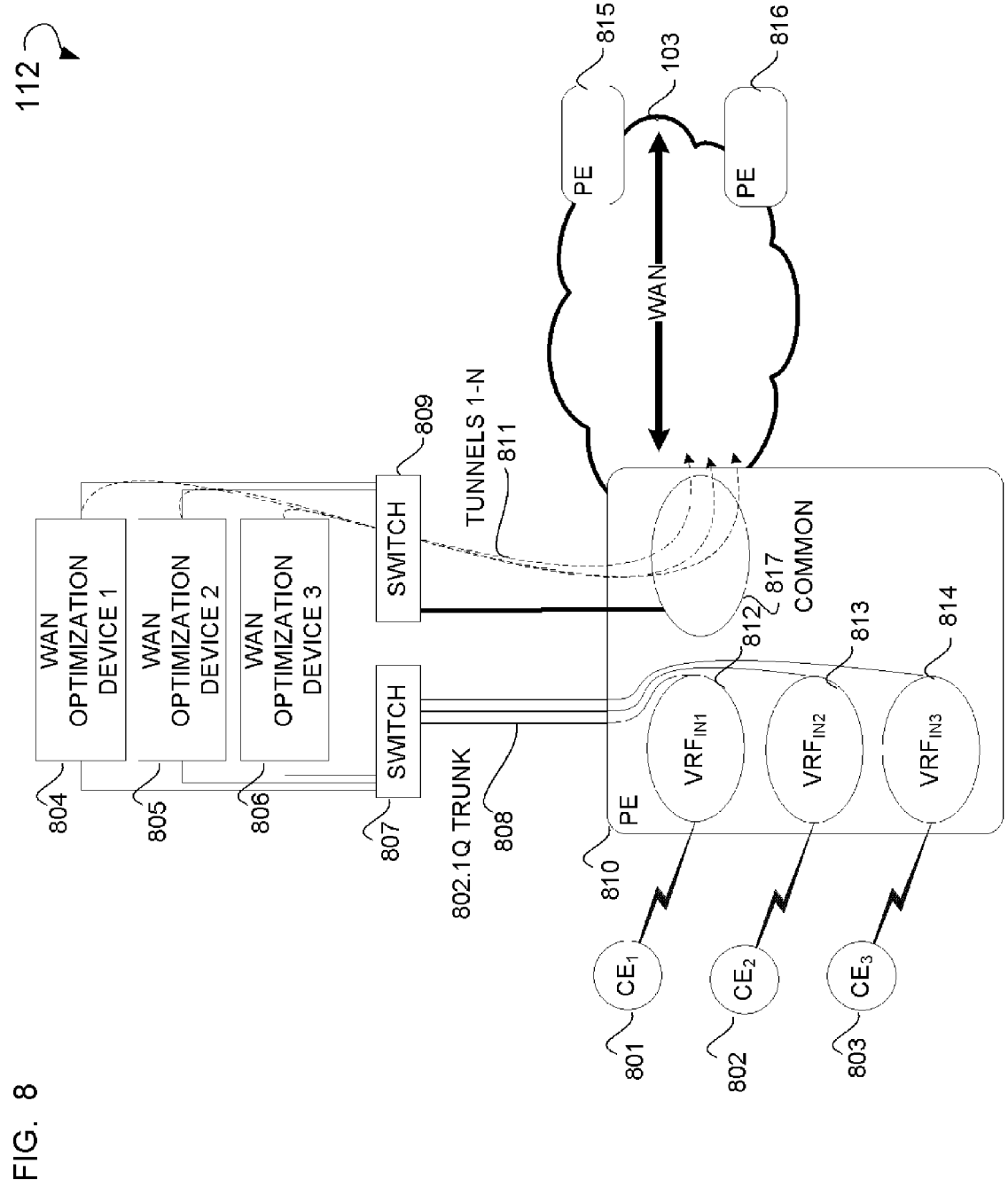
FIG. 8 is a diagram of an architecture, according to an example embodiment, for a transaction accelerator, wherein this transaction accelerator utilizes a plurality of WAN optimization devices and a conjunction with a common VRFout table.

FIG. 8 is a diagram of an example architecture for a transaction accelerator 112 where this transaction accelerator 112 utilizes a plurality of WAN optimization devices and a conjunction with a common VRFout table 817. Shown is a CE router 801, a CE router 802 and a CE router 803 that are connected to, for example, a PE router 810. Residing as a part of this PE router 810 is a VRFin table 812, a VRFin table 813 and a VRFout table 814. Further, a common logical VRFout table 817 is also shown as residing as a part of the PE router 810. Operatively connecting the PE router 810 to a switch 807 and ultimately to one of the WAN optimization devices 804-806 each dedicated to serve data traffic sourced by or destined to the LANs served by CE 801-803 respectively is an 802.1Q trunk 808. This 802.1Q trunk 808 may connect the switch 807 to the PE router 810 via some type of physical interface and/or physical connection. This switch 807 may be used to route traffic from, for example, the PE router 810.

In one embodiment the CE router 801 may transmit a data packet to the PE router 810, where this data packet is formatted using a TCP/IP header. Once received by the PE router 810, the data packet is buffered and a lookup is conducted using the VRFin table 812. A VLAN header may be affix to the data packet, and the data packet transmitted along the 802.1Q trunk 808 to the switch 807. This switch 807 them may route the data packet to one or more of the WAN optimization devices 804-806. Once received at one of these WAN optimization devices 804-806, this data packet may be optimized. Optimization may include compressing the data included in the data packet, caching the data in the data packet, tunneling the data in the data packet, modifying the TCP/IP window size, providing local TCP acknowledgements, or performing some other suitable optimization technique on the data. The now optimized data packet may be wrapped or tunneled for transmission along one or more of the tunnels 811. These tunnels may include wrapping the data packet in, for example, a header in a form of, for example, an GRE tunnel, IPSEC tunnel, or MPLS header. In such cases, a tunnel shall be dedicated to a particular client LAN to provide the segmentation of traffic from multiple client LANs. A switch 809 may be used to route the data packet along one of the tunnels 811. In certain example cases, a tunnel may be dedicated to a particular client LAN. A common logical VRFout table 817 may be used to lookup a destination address for the data packet. This data packet may be transmitted across a WAN 103 to be received by a PE router 815 and/or PE router 816. The PE router 816 may itself be part of an additional transaction accelerator 112, or plurality of transaction accelerators 112.

Figure 9:
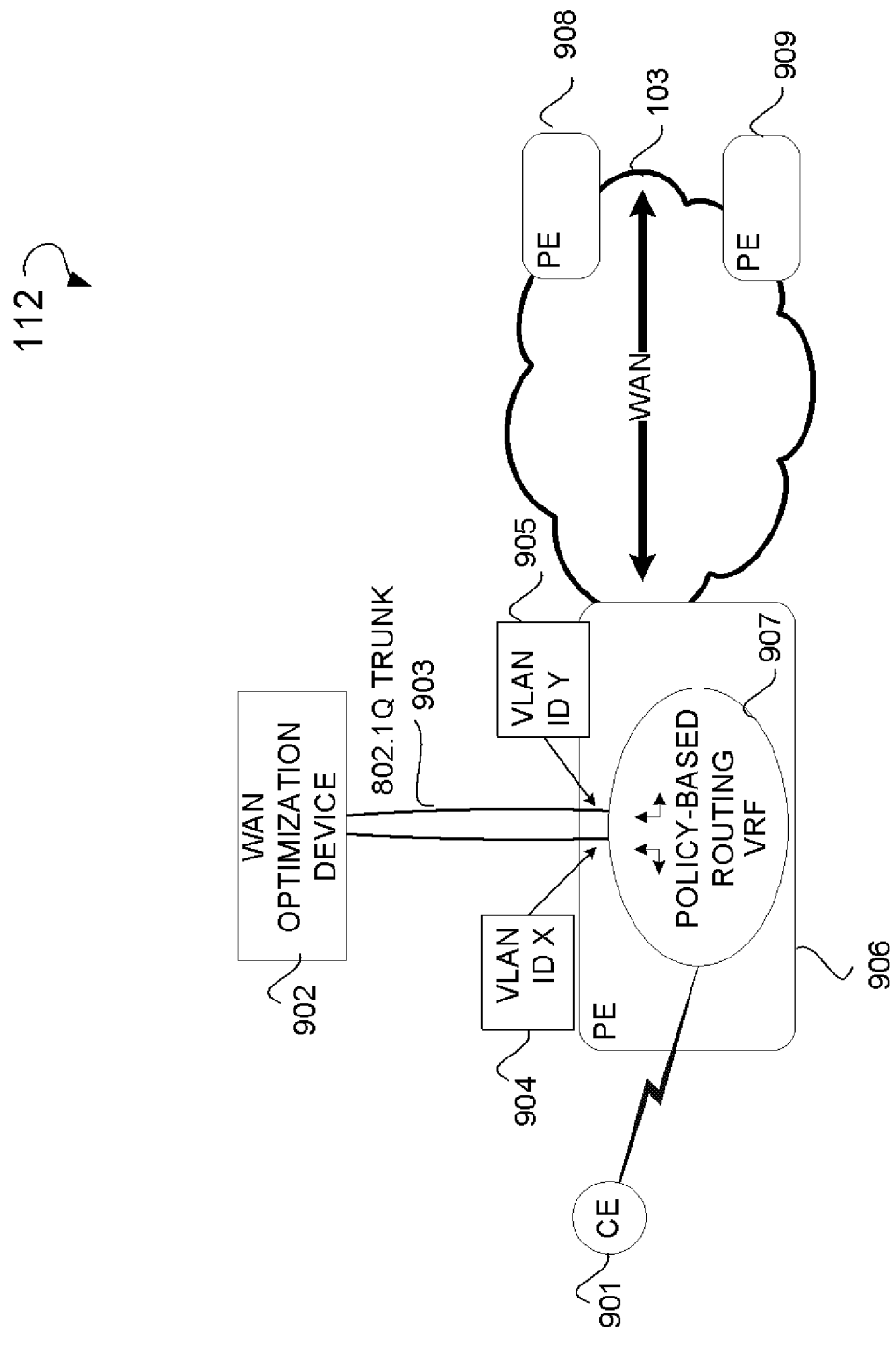
FIG. 9 is a diagram of an architecture, according to an example embodiment, for a transaction accelerator illustrating the use of a policy-based routing regime.

FIG. 9 is a diagram of an example architecture for a transaction accelerator 112 illustrating the use of a policy-based routing regime. Shown is a CE router 901 that is operatively connected to a PE router 906 wherein this PE router 906 includes a policy-based routing VFR table 907. Connected to this PE router 906 are a VLAN ID X module 904 and a VLAN ID Y module 905. Further, operatively connected to this PE router 906 is an 802.1Q trunk 903. This 802.1Q trunk 903 further connects a WAN optimization device 902 to the PE router 906.

In one example embodiment, the CE router 901 transmits a data packet to the PE router 906. Once received by the PE router 906 and based upon some type of policy-based routing regime, a VLAN header is affixed to the data packet through the execution of the VLAN ID X module 904. This policy-based routing regime may include an instruction to route all data packets entering the PE router 906 to the WAN optimization device 902 prior to forwarding the data packets across the WAN 103. Further policies may include, for example, giving preference to certain size data packets, or packets utilizing certain types of protocols. The data packet is transmitted across the 802.1.Q trunk 903 to the WAN optimization device 902. Once received by the WAN optimization device 902, the data packet may be optimized. Optimization may include compressing the data included in the data packet, caching the data in the data packet, tunneling the data in the data packet, modifying the TCP/IP window size, providing local TCP acknowledgements, or performing some other suitable optimization technique on the data. The second VLAN ID Y module 905 may be executed, where this VLAN ID Y module 905 may be used to attach a different VLAN header to the data packet. Using certain policy designed by a network administrator and implemented by the policy based routing regime, the PE router 906 may transmit this data packet across the WAN 103 to be received by, for example, a PE router 908 or PE router 909. These PE routers 908 and 909 may themselves be part of an additional transaction accelerator 112, or plurality of transaction accelerators 112.

Figure 10:
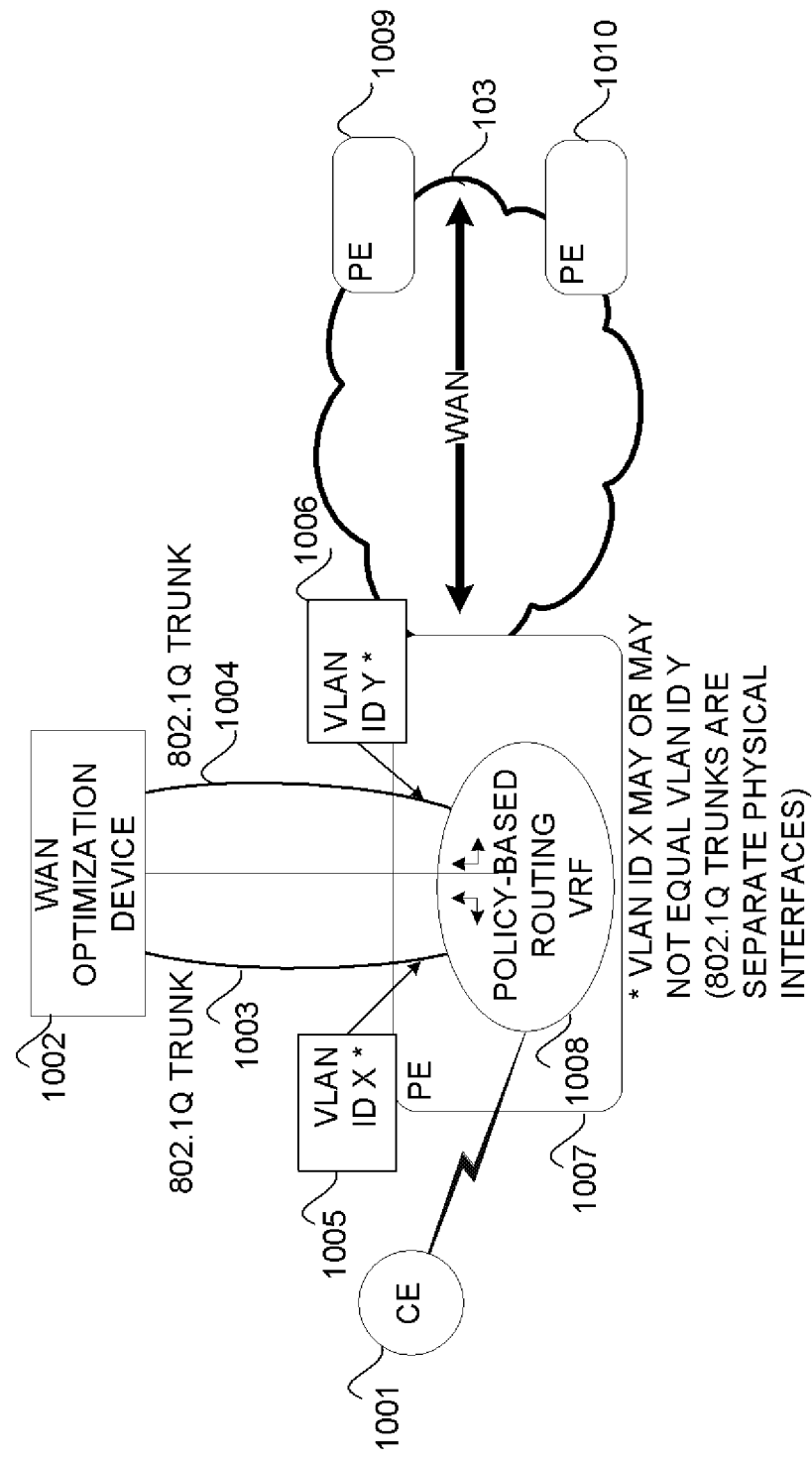
FIG. 10 is a diagram of an architecture, according to an example embodiment, for a transaction accelerator utilizing a policy-based routing regime with distinct physical interfaces.

FIG. 10 is a diagram of an example architecture for a transaction accelerator 112 utilizing a policy-based routing regime with distinct physical interfaces between a WAN optimization device 1002 and a PE router 1008. Shown is a CE router 1001 that is connected to a PE router 1007. Residing on this PE router 1007 is a policy-based routing VFR table 1008. This PE router 1007 is connected via a plurality of physical interfaces to WAN optimization device 1002. This connection is in the form of, for example, an 802.1Q trunk 1003 and an 802.1Q trunk 1004.

In some example cases, the CE router 1001 may transmit a data packet to the PE router 1007. Once received by the PE router 1007, the policy-based routing VFR table 1008 may implement a policy of forwarding all incoming data packets to the WAN optimization device 1002 by listing the destination address as being that of the WAN optimization device 1002. Other policies that may be implemented by the PE router 1007 may include giving priority to the data packet based on considerations of data packet size or protocol requirements. A VLAN ID X module 1005 is executed that attaches a VLAN header to the data packet received by the PE router 1007. The packet now including the VLAN header may be transmitted across the previously referenced 802.1Q trunk 1003 to WAN optimization device 1002. When received by the WAN optimization device 1002, the data packet is optimized. Optimization may include compressing the data included in the data packet, caching the data in the data packet, tunneling the data in the data packet, modifying the TCP/IP window size, providing local TCP acknowledgements, or performing some other suitable optimization technique on the data. The data packet may be transmitted back across the 802.1Q trunk 1004. Prior to being transmitted across the 802.1Q trunk 1004, the VLAN ID Y module 1006 is executed to attach a different VLAN header to the data packet. In some cases, VLAN ID Y module 1006 may not be executed. Once the VLAN ID Y module 1006 is executed and the data packet received at the PE router 1007, the data packet is transmitted across the WAN 103 to be received by, for example, a PE router 1009 or PE router 1010. These PE routers 1009 and 1010 may themselves be part of an additional transaction accelerator 112, or a plurality of transaction accelerators 112.

Figure 11:
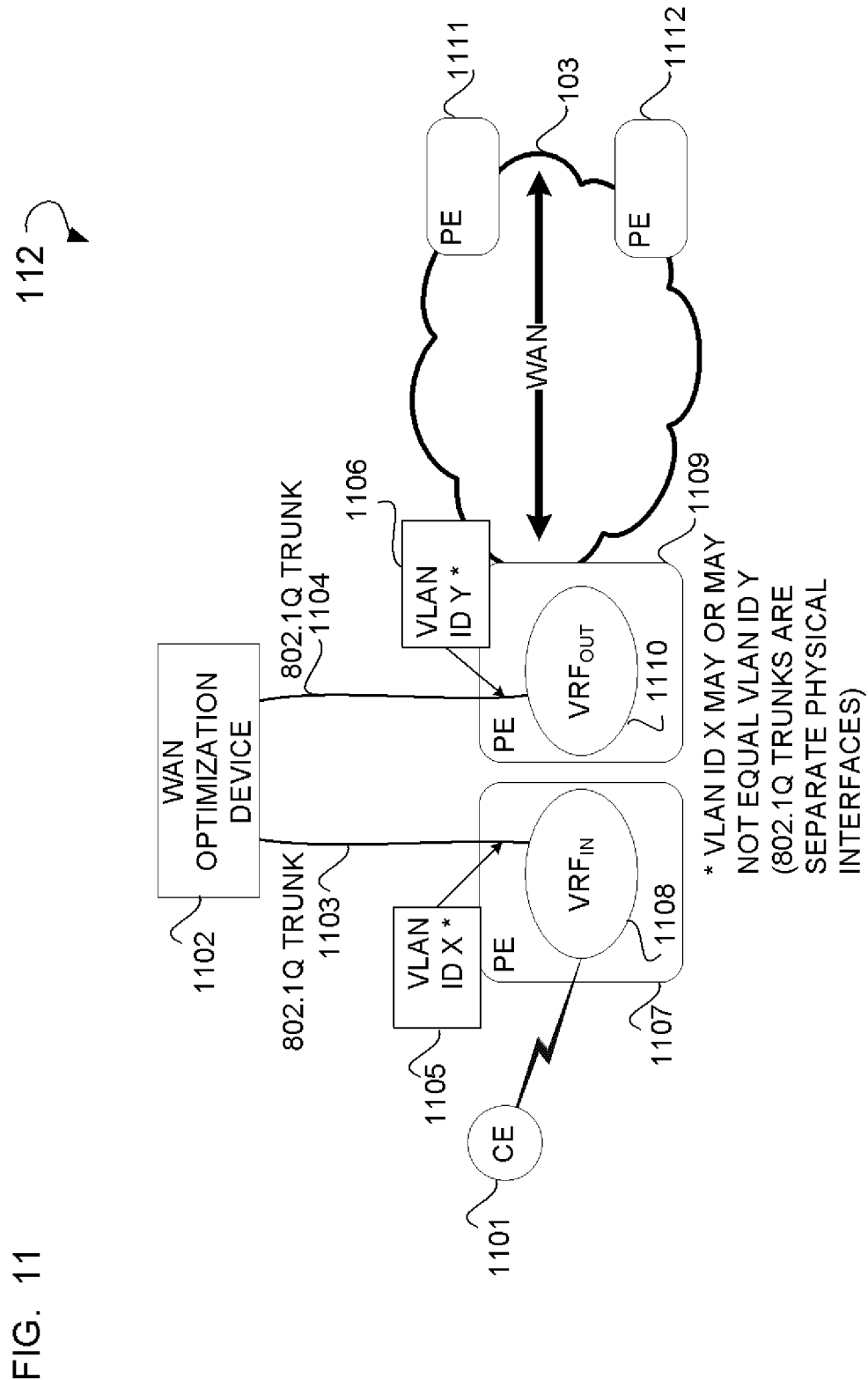
FIG. 11 is a diagram of a architecture, according to an example embodiment, for a transaction accelerator, wherein this example architecture includes the use of two physical connections between a WAN optimization device and a two network appliances.

FIG. 11 is a diagram of an example architecture for a transaction accelerator 112 where a plurality of network appliances are used in conjunction with the WAN optimization device. Shown is a CE router 1101 that is connected to a PE router 1107. Residing as a part of this PE router 1107 is a VRFin table 1108. This VRFin table 1108 may, in some instances, be connected via a physical interface to a WAN optimization device 1102. This connection is in the form of, for example, an 802.1Q trunk 1103. Further, this WAN optimization device 1102 is connected to a PE router 1109 via physical interface and further through an 802.1Q trunk 1104. Residing as a part of this PE router 1009 is a VRFout table 1110.

In one example embodiment the CE router 1101 transmits a data packet to the PE router 1107. Once received by the PE router 1107, a look-up is conducted of the VRFin table 1108, looking for a destination address associated with the data packet. Once this destination address is determined, a VLAN ID X module 1105 is executed that affixes a VLAN header and associated VLAN ID to the data packet. This data packet is then transmitted across the previously referenced 802.1Q trunk 1103 to be received by, for example, the WAN optimization device 1102. Once received by the WAN optimization device 1102, the data packet is optimized. Optimization may include compressing the data included in the data packet, caching the data in the data packet, tunneling the data in the data packet, modifying the TCP/IP window size, providing local TCP acknowledgements, or performing some other suitable optimization technique on the data. The now optimized data packet is transmitted across the 802.1Q trunk 1104. In some cases, prior to transmission of the data packet, a VLAN ID Y module 1106 is executed to attach a different VLAN header to the data packet. A lookup may then be performed using the VRFout table 1110, and the data packet transmitted across the WAN 103 to a PE router 1111, and/or PE router 1112. These PE routers 1111 and 1112 may themselves be part of an additional transaction accelerator 112, or plurality of transaction accelerators 112.

Figure 12:
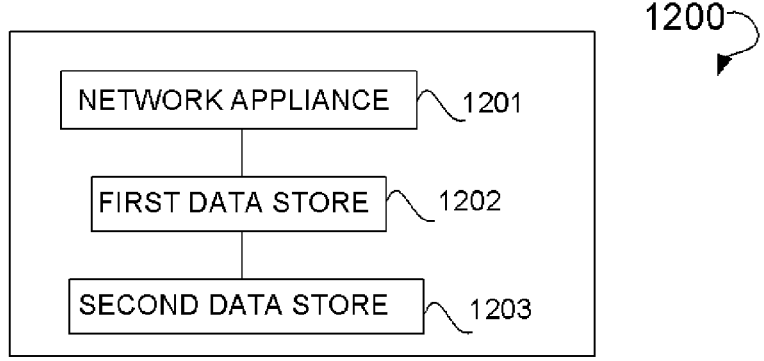
FIG. 12 is a block diagram of a transaction accelerator, according to an example embodiment, using VRFout tables.

FIG. 12 is a block diagram of a computer system 1200 and the various blocks that reside therein. These blocks may be implemented in hardware, software, or firmware, and may be operatively connected via a logical or physical connection. In some example embodiments, illustrated is a network appliance 1201 configured to implement VRF, operatively connected to a WAN optimization device through a first physical interface. A first data store 1202 is also shown with a first VRFin routing table, the first data store residing on the network appliance. Moreover, a second data store 1203 is also shown with a second VRFout routing table, the second data store residing on the network appliance. Some example embodiments may include, the network appliance, configured to implement VRF, is operatively connected to the WAN optimization device through a second physical interface. Additionally, in some example embodiments, the network appliance is configured to implement policy based routing. The network appliance is operatively connected to the WAN optimization device through a second physical interface. In some example embodiments, another network (not pictured) appliance is operatively connected to the WAN optimization device through a second physical interface.

Figure 13:
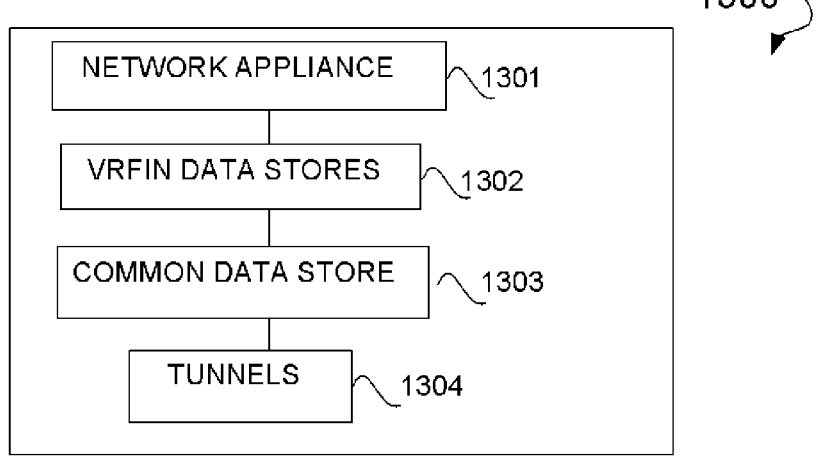
FIG. 13 is a block diagram of a transaction accelerator, according to an example embodiment, using tunneling to transmit data packets.

FIG. 13 is a block diagram of a computer system 1300 and the various blocks that reside therein. These blocks may be implemented in hardware, software, or firmware, and may be operatively connected via a logical or physical connection. Illustrated is a network appliance 1301, configured to implement VRF, operatively connected to a WAN optimization device through a physical interface. Additionally, a plurality of VRFin data stores 1302 are illustrated, where each VRFin data store of the plurality of VRFin data stores has a single VRFin routing table. Further, in some example embodiments, a single common data store 1303 with a VRFout routing table. In some example cases, the physical interface is operatively connected to a 802.1Q trunk. Additionally, a plurality of tunnels 1304 are shown as being operatively connected to the WAN optimization device, each of the plurality of tunnels operatively connected to a LAN by a connection including at least one of a physical or logical connection. The single common data store is a common logical data store. Further, the network appliance is a PE router.

Figure 14:
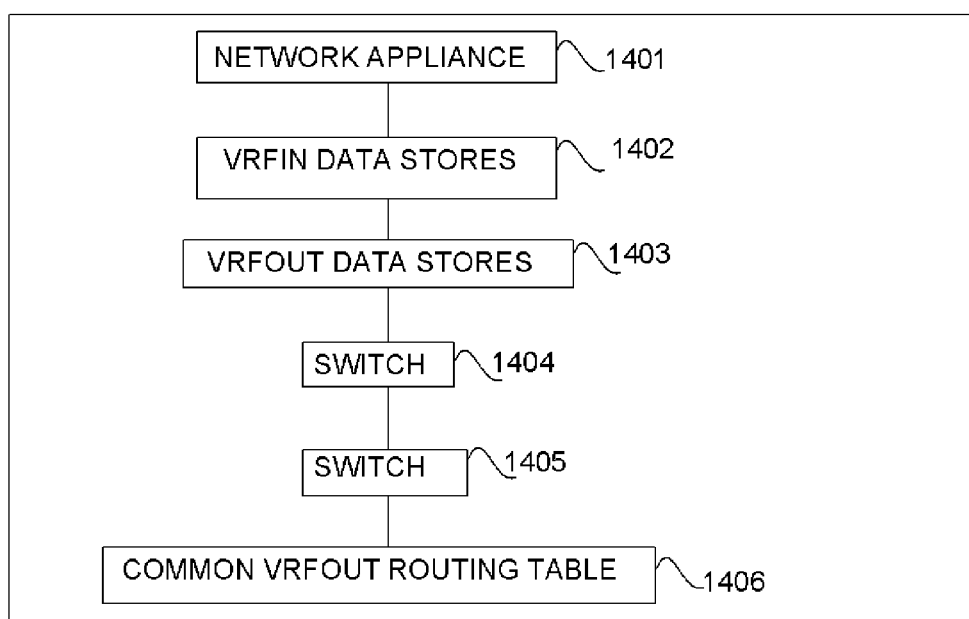
FIG. 14 is a block diagram of a transaction accelerator, according to an example embodiment, using multiple WAN optimization devices.

FIG. 14 is a block diagram of a computer system 1400 and the various blocks that reside therein. These blocks may be implemented in hardware, software, or firmware, and may be operatively connected via a logical or physical connection. Illustrated is a network appliance 1401, configured to implement VRF, operatively connected to a plurality of WAN optimization devices through a plurality of first physical interfaces. Also, in some example embodiments, a plurality of VRFin data stores 1402 are shown where each VRFin data store, of the plurality of VRFin data stores, has a VRFin routing table. A plurality of VRFout data stores 1403 are illustrated where each VRFout data store, of the plurality of VRFout data stores, has a VRFout routing table. The network appliance and WAN optimization device are connected through a plurality of second physical interfaces. Some example embodiments may include, a switch 1404 to manage data packets received through the plurality of first physical interfaces. Also, a switch 1405 is shown that manages the data packets received through the plurality of second physical interfaces. A common VRFout routing table 1406 is shown.

Figure 15:
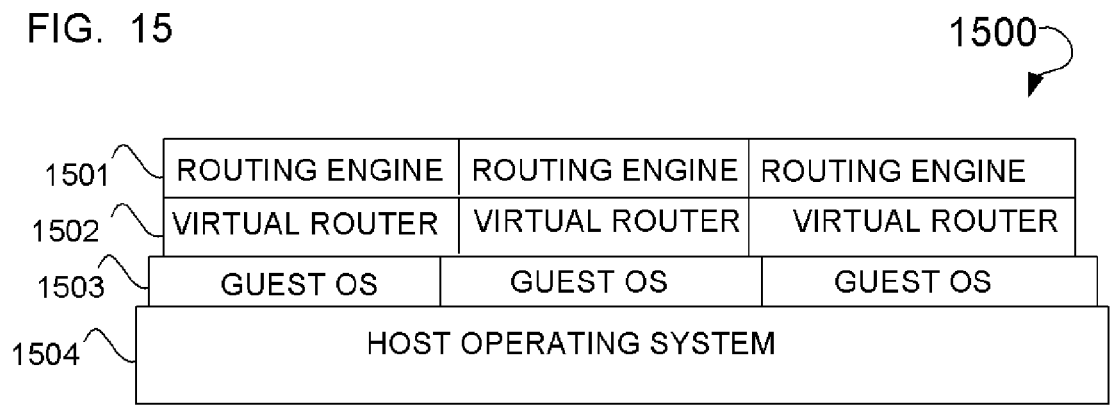
FIG. 15 is a diagram of a software architecture, according to an example embodiment, for a WAN optimization device utilizing a host operating system technique to provide virtualization for a particular computer system.

FIG. 15 is a diagram of an example software architecture for a WAN optimization device 1500 utilizing a host operating system technique to provide virtualization for a particular computer system. This WAN optimization device 1500 is, for example, the previously referenced WAN optimization devices 113, 115 and/or 117. Shown is a layer 1504 labeled host operating system, where this layer 1504 serves to manage further layers of functionality that reside on top of this layer 1504. Further, this host operating system residing at layer 1504 may provide an interface to various computer system hardware resources such as, for example, a Central Processing Unit (CPU), persistent storage (e.g., a magnetic or optical drive), Random Access Memory (RAM), or other hardware resources. Residing upon the layer 1504 is a layer 1503 labeled guest OS. In some example embodiments, a plurality of guest OSs, represented here by layer 1503, are ported such that each guest OS is aware of the other guest OSs that resides as a part of the same layer. These guest OSs, as represented in layer 1503, may be managed by layer 1504. These various instances of guest OSs are instances of the same or different operating system, where this operating system is LINUX™, Microsoft WINDOWS™ or some other suitable operating system known in the art. Residing on top of this layer 1503 is a layer 1502 including various virtual routers. These virtual routers may be managed by the layer 1503 and its various guest operating systems. For example, a single virtual router may be managed by a single guest OS. Further, residing on top of the layer 1502 is a layer 1501 including various routing engines. These routing engines may be managed by the layer 1502 and its various virtual routers. For example, a single routing engine is managed by a single virtual router. Further, these routing engines outlined in layer 1501 may have access to a plurality of VRFin tables such as, for example, VRFin table 708-710 as well as having access to a plurality of VRFout tables such as, for example, VRFout table 509 and VRFout tables 615-617. Virtualization is used to manage various system resources and limits associated therewith including disc quotas, Input/Output (I/O) rate limits, memory limits, the CPU quotas, and various network interfaces and associated network traffic.

In some example embodiments, through the use of this virtual machine and in particular the WAN optimization device 1500 that utilizes the virtual machine, a plurality of customers is serviced, where each customer included has a plurality of destination addresses associated with it. In certain circumstances, through the use of this virtual machine, there may be overlap in terms of destination addresses and the uniqueness associated with each. This overlap may be made possible by the fact that, for example, the layer 1503 and the guests OSs included therein may not access the system resources allocated for the other guest OSs that may reside as a part of this layer 1503. For example, if a particular area of a hard drive has been reserved for a VRFin table controlled by a specific guest OS, then the other guest OSs and their associated virtual routers and routing engines may not access this particular disc space.

Figure 16:
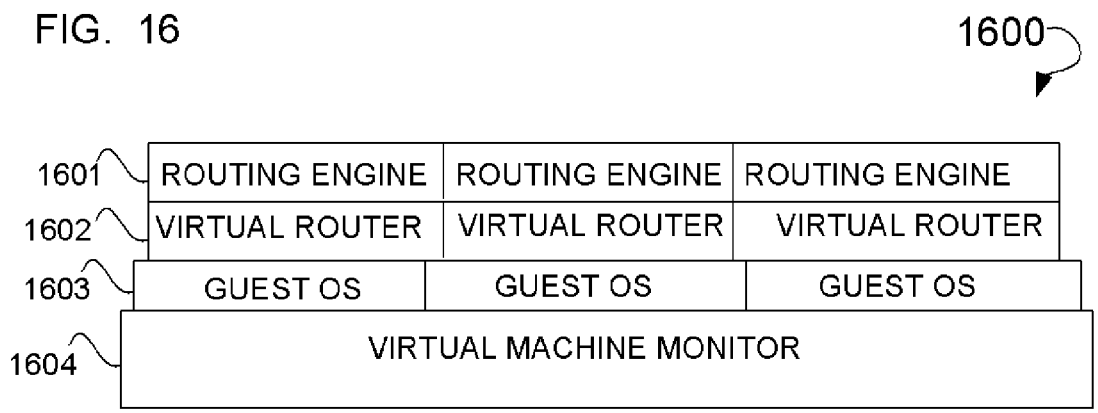
FIG. 16 is a diagram of a software architecture, according to an example embodiment, for a WAN optimization device utilizing a virtual machine technique to provide virtualization for a particular computer system.

FIG. 16 is a diagram of an example software architecture for a WAN optimization device 1600 utilizing a virtual machine technique to provide virtualization for a particular computer system. In some example embodiments, this WAN optimization device 1600 is the WAN optimization device 113, 115 or 117. Shown is a WAN optimization device 1600 represented as a number of layers of functionality in the form of blocks. For example, shown is a layer 1604 referenced as a virtual machine monitor. This virtual machine monitor, in some example embodiments, may provide an interface to various computer system hardware resources such as, for example, a CPU, persistent storage (e.g., a magnetic or optical drive), RAM, or other hardware resources. Further illustrated is a layer 1603 that resides upon the layer 1604, where this layer 1603 is composed of a plurality of guest OSs. These guest OSs may, in turn, manage or control a layer 1602 including a variety of virtual routers. In some example embodiments, these various instances of guest OSs are instances of the same or different operating system. These operating systems include, for example, LINUX™, Microsoft WINDOWS™ or some other suitable operating system known in the art. Further, this layer 1603 may utilize various system resources through the use of the layer 1604 and the virtual machine monitor included therein. Also shown is a layer 1602 including a plurality of virtual routers. This layer 1602 may, in turn, control and otherwise support a layer 1601 including a plurality of routing engines. These routing engines may have access to a plurality of VRFin tables such as VRFin table 708-710. Further, these routing engines may have access to a plurality of VRFout tables such as VRFout table 509 and VRFout tables 615-617.

In some example embodiments, through the use of this virtual machine and in particular the WAN optimization device 1600 that utilizes the virtual machine, a plurality of customers are serviced. Each customer may have a plurality of destination addresses associated with it. In certain circumstances, through the use of this virtual machine, there may be overlap in terms of destination addresses and the uniqueness associated with each. This overlap may be made possible by the fact that, for example, the layer 1603 and the guests OSs included therein may not access the system resources allocated for the other guest OSs that may reside as a part of this layer 1603. For example, if a particular area of a hard drive has been reserved for a VRFin table controlled by a specific guest OS, then the other guest OSs and their associated virtual routers and routing engines may not access this particular disc space.

Figure 17:
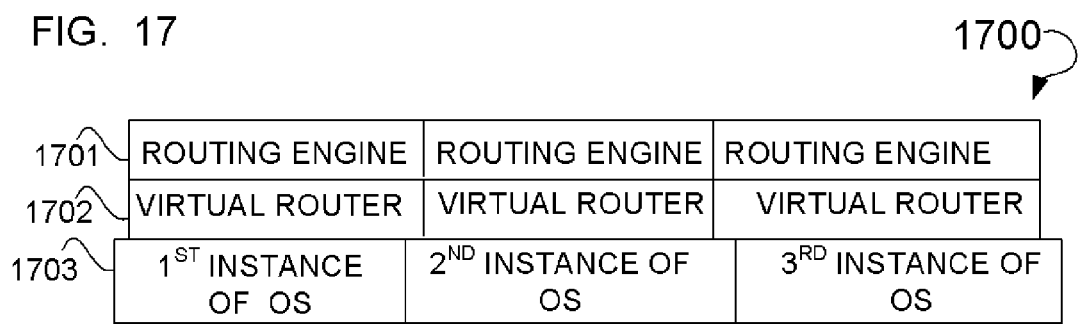
FIG. 17 is a diagram of a software architecture, according to an example embodiment, for a WAN optimization device utilizing virtualization on an Operating System (OS) level to provide virtualization for a particular computer system.

FIG. 17 is a diagram of an example software architecture for a WAN optimization device 1700 utilizing virtualization on an OS level to provide virtualization for a particular computer system. Shown is a WAN optimization device 1700 and the various layers and blocks and functionality associated therewith. With this WAN optimization device 1700 may be the previously referenced WAN optimization device 113, 115 and/or 117. Illustrated is a layer 1703 including a plurality of instances of operating systems. In some example embodiments, these various instances of OSs may be instances of the same operating system. This operating system may be LINUX™, Microsoft WINDOWS™ or some other suitable operating system known in the art. Residing on top of this layer 1703 is a layer 1702 including a plurality of virtual routers wherein each one of these virtual routers is controlled by, for example, one or more of the operating systems included or residing otherwise at the layer 1703. This layer 1702 and the virtual routers associated therewith, in turn, control various routing engines residing as a part of a layer 1701 that resides on top of the layer 1702. As in FIGS. 15 and 16, various system resources are controlled by the operating systems residing at the layer 1703. These resources may include, for example, the CPU access, disc space or other suitable system resources. Through the use of virtualization on an OS level, destination address overlap is utilized within a single computer system such that, for example, the same destination addresses is stored within a VRFin table or VFRout table and otherwise accessed by the computer system utilizing the virtualization on an OS level methodology.

Figure 18:
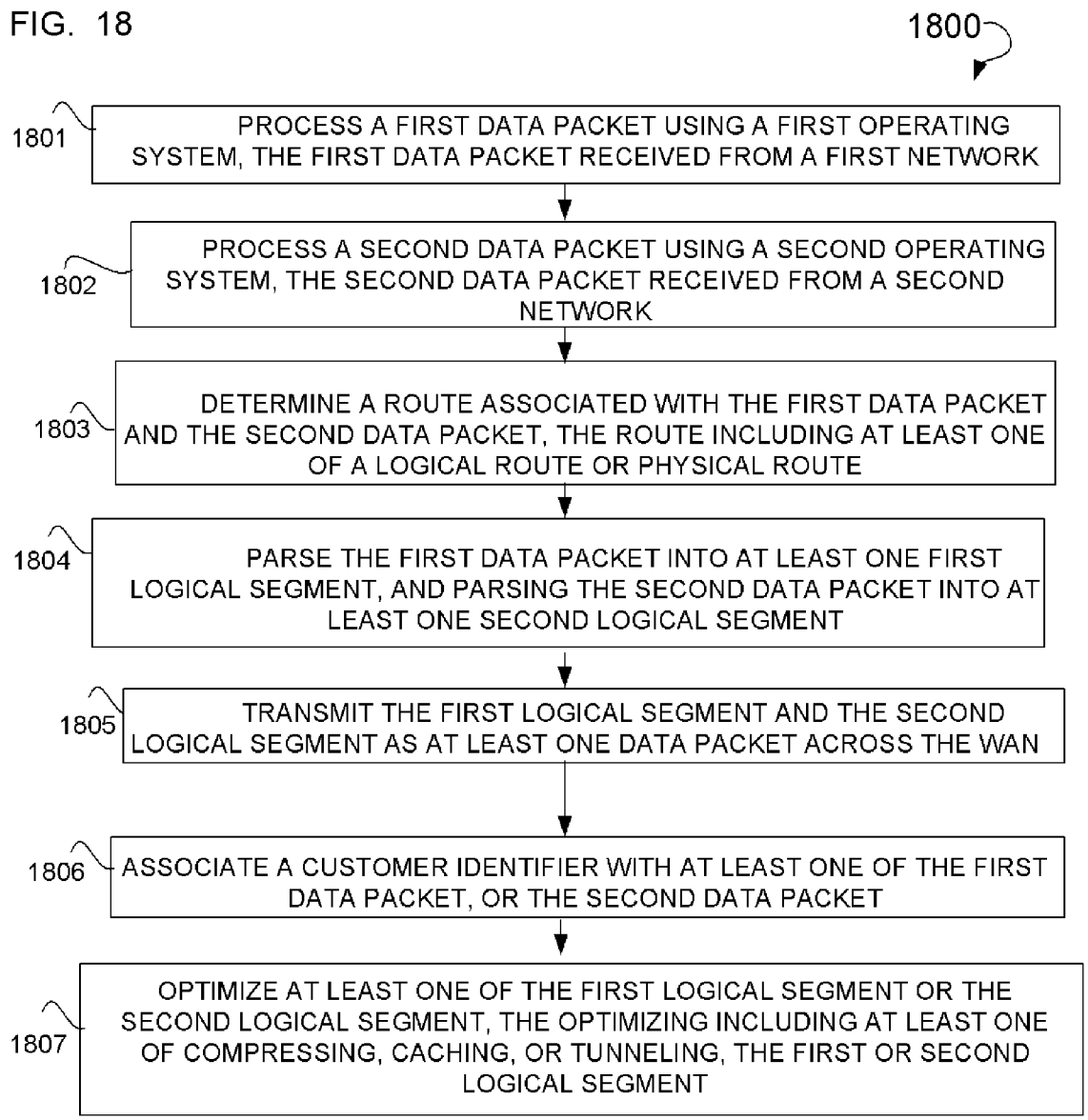
FIG. 18 is a flow chart illustrating a method, according to an example embodiment, to optimize a plurality of LAN traffic using a transaction accelerator.

FIG. 18 is a flow chart illustrating an example method 1800 to optimize a plurality of LAN traffic using a transaction accelerator. Shown are various operations 1801 through 1807, where each of these operations may reside as part of a transaction accelerator 112. An operation 1801 is executed to process a first data packet using a first operating system, the first data packet received from a first network. An operation 1802 is executed to process a second data packet using a second operating system, the second data packet received from a second network. Further, an operation 1803 is executed to determine a route associated with the first data packet and the second data packet, the route including at least one of a logical route or physical route. An operation 1804 is executed to parse the first data packet into at least one first logical segment, and parsing the second data packet into at least one second logical segment. An operation 1805 is executed to transmit the first logical segment and the second logical segment as at least one data packet across the WAN. In some example embodiments. Some example embodiments may include, the first network and the second network are LANs. An operation 1806 is executed to associate a customer identifier with at least one of the first data packet, or the second data packet. Additionally, an operation 1807 is executed to optimize at least one of the first logical segment or the second logical segment, the optimizing including at least one of compressing, caching, or tunneling, the first or second logical segment. In some example embodiments, the first operating system and second operating systems are virtualized.

In some example embodiments, a computer implemented method to optimize a plurality of data packets is shown. This example method may include an operation that when executed processes a first data packet using a first operating system, the first data packet received from a first network. Some example embodiments may include, a first data packet being an TCP/IP based data packet received from a LAN that acts as a first network. Additionally, in some example embodiments, an operation is executed that processes a second data packet using a second operating system, the second data packet received from a second network. This second data packet is a TCP/IP based data packet that is received from a another LAN that acts as a second network. Further, in some example embodiments, an operation is executed to make a determination regarding a route associated with the first data packet and the second data packet, the route including at least one of a logical route or physical route. This route may be a route between a plurality of network appliance existing as part of a WAN. Additionally, in some example embodiments, an operation is executed to parse the first data packet into at least one first logical segment, and parsing the second data packet into at least one second logical segment. A logical segment may, in some example embodiments, be a segment of data formatted based upon certain logically based considerations relating to a data packet or data field size, or some other suitable basis. This size may be in terms of bits, nibbles, bytes, or some other suitable measure. In some example embodiments, an operation is executed so as to transmit the first logical segment and the second logical segment as at least one data packet across a WAN. In some example embodiments, an operation is executed so as to associate a customer identifier with at least one of the first data packet, or the second data packet. This customer identifier may be a VLAN ID value, IP address values, Media Access Control (MAC) value, or some other way to distinguish customers within a data stream coming from a network. Some example embodiments may include, the execution of an operation to optimize at least one of the first logical segment or the second logical segment, the optimizing including at least one of compressing, caching, or tunneling, the first or second logical segment.

Figure 19:
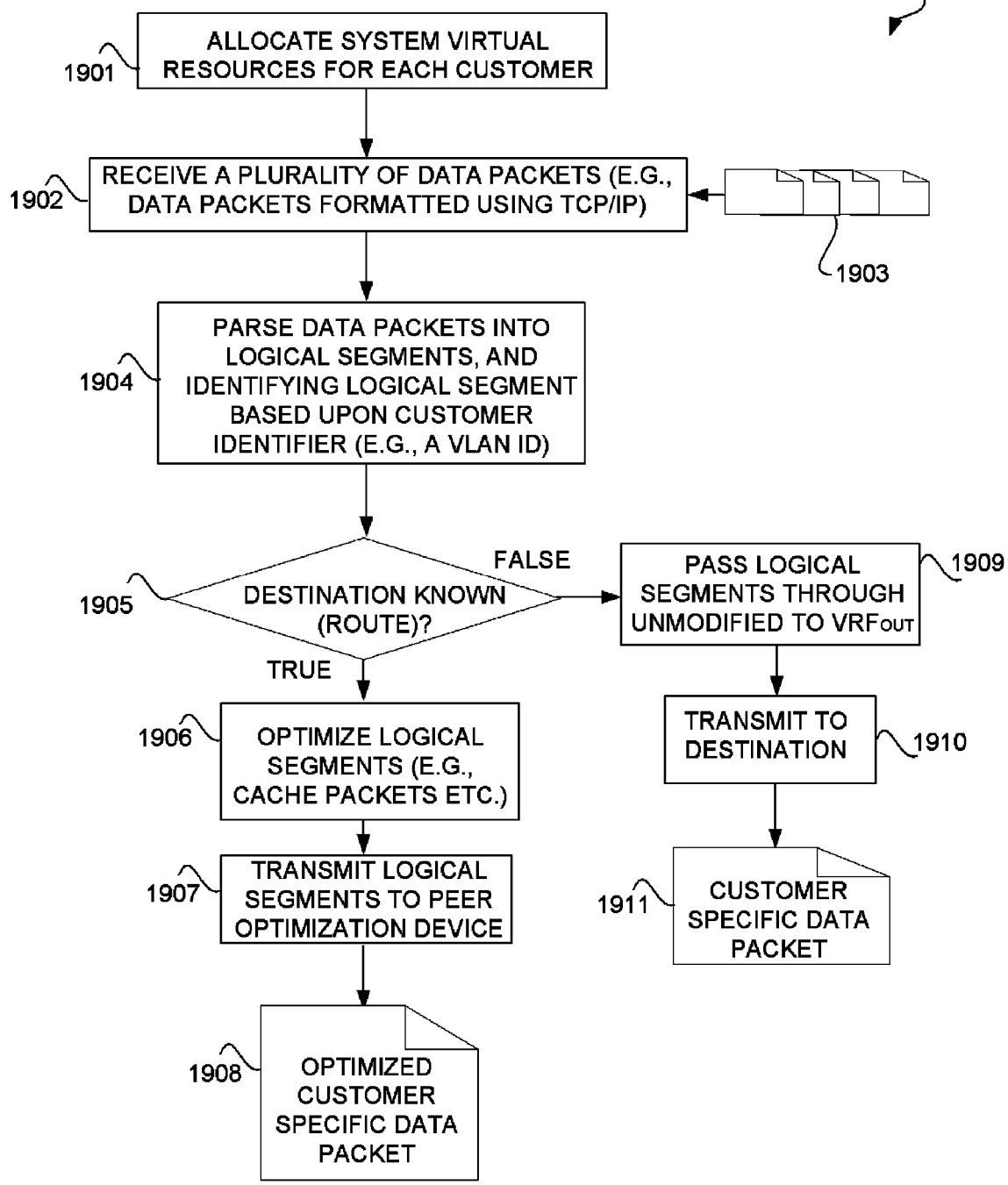
FIG. 19 is a flowchart illustrating a method, according to an example embodiment, used to generate a customer specific data packet.

FIG. 19 is a flowchart showing an example method 1900 used to generate a customer specific data packet. Illustrated are various operations 1901-1902, and 1904-1911 that may reside as part of a WAN optimization device (e.g., WAN optimization devices 113, 115, and 117). In some example embodiments, an operation 1901 is executed that allocates the system virtual resources for each customer. These system virtual resources may be allocated using any one of the number of previously referenced models for virtualization such as, for example, paravirtualization, virtual machine, or virtualization on an OS level. An operation 1902 is executed that receives a plurality of data packets 1903. An operation 1904 is executed that parses these data packets on logical segments and identifies each logical segment with a customer identifier. This customer identifier is, for example, a VLAN ID associated with a VLAN header that is affixed to each of the TCP/IP data packets. A decisional operation 1905 is executed that determines whether a destination route is known to have a corresponding peer transaction accelerator associated with the route destination on the remote side of the WAN. In the cases where the decisional operation 1905 evaluates to "true," an operation 1906 is executed that optimizes the logical segment (e.g., the data or data packet in some cases). Optimization may include compressing the data, caching the data, tunneling the data, modifying the TCP/IP window size, providing local TCP acknowledgements, or performing some other suitable optimization technique on the data. An operation 1907 is executed that transmits the now optimized logical segment as an optimized customer specific data packet 1908 to a peer device such an additional transaction accelerator. In some example embodiments, the transmission of this optimized customer specific data packet 1908 is conducted by a network appliance such as a PE router. In the cases where the decisional operation 1905 evaluates to "false," an operation 1909 is executed wherein the logical segment passes through the WAN optimizer without being optimized. The destination address for the logical segment is then looked up in, for example, the VRFout table. An operation 1910 is executed to transmit this logical segment as a customer specific data packet 1911. In some example cases, the transmission of this customer specific data packet 1911 is conducted by a network appliance such as a PE router.

Figure 20:
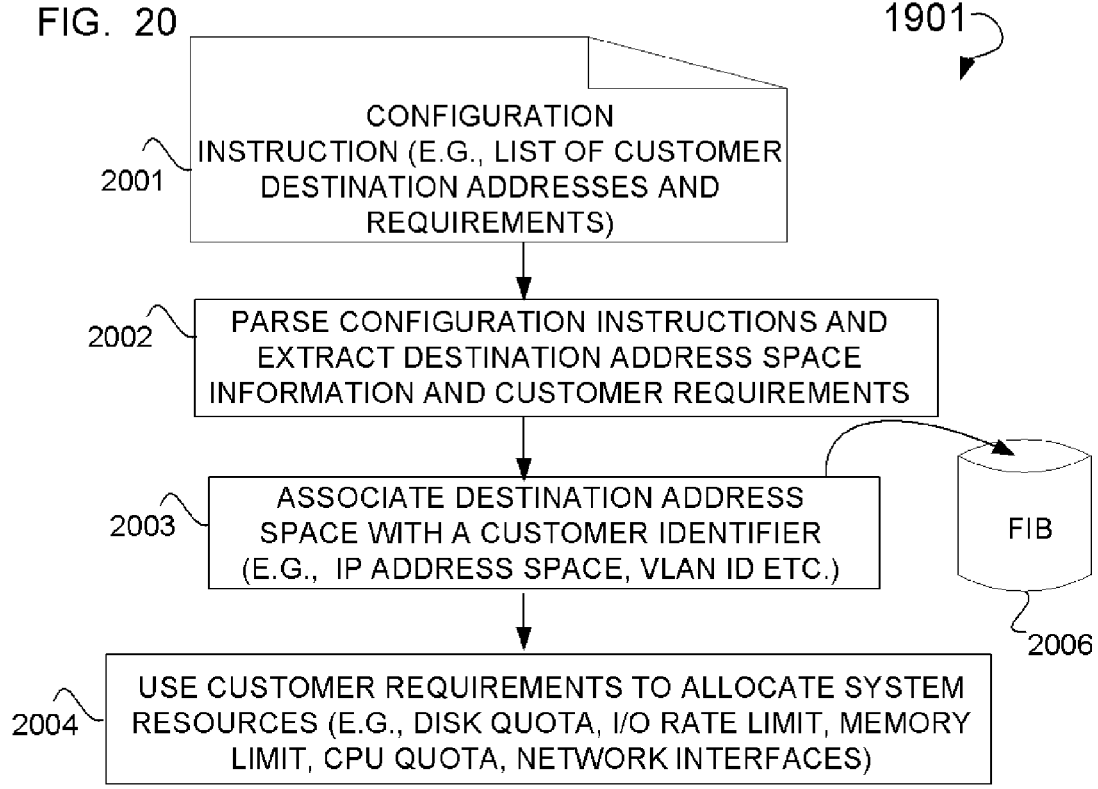
FIG. 20 is a flowchart illustrating a method, according to an example embodiment, used to execute an operation to allocate virtual system resources.

FIG. 20 is a flowchart illustrating an example method used to execute operation 1901. Shown is a configuration of instruction 2001 where this configuration instruction may, for example, contain a list of customer destination addresses and specific requirements for a particular customer. These requirements may include, for example, various system resource allocations for a specific customer as implemented by, for example, paravirtualization, a virtual machine, or virtualization on an OS level. Further, these requirements may include the giving of priority to certain customers and their associated data packets (e.g., quality of service requirements). When executed, operation 2002 parses a configuration of instructions and extracts destination address space information in the customer requirements. An operation 2003 is executed that associates the destination address based with the customer identifier, where customer identifier is, for example, an IP address space, a VLAN ID, or some other suitable customer identifier. Once association occurs, then the destination address and customer identifiers are stored into the FIB 1906. As previously referenced, in some example embodiments, the plurality of FIBs is utilized in conjunction with a plurality of VRFin tables and VRFout tables. An operation 2004 is executed, in some example embodiments, that uses the customer requirements to allocate certain system resources such as, for example, a previously referenced disc quota, I/O rate limit, memory limits, CPU quota and/or network interface requirements.

Figure 21:
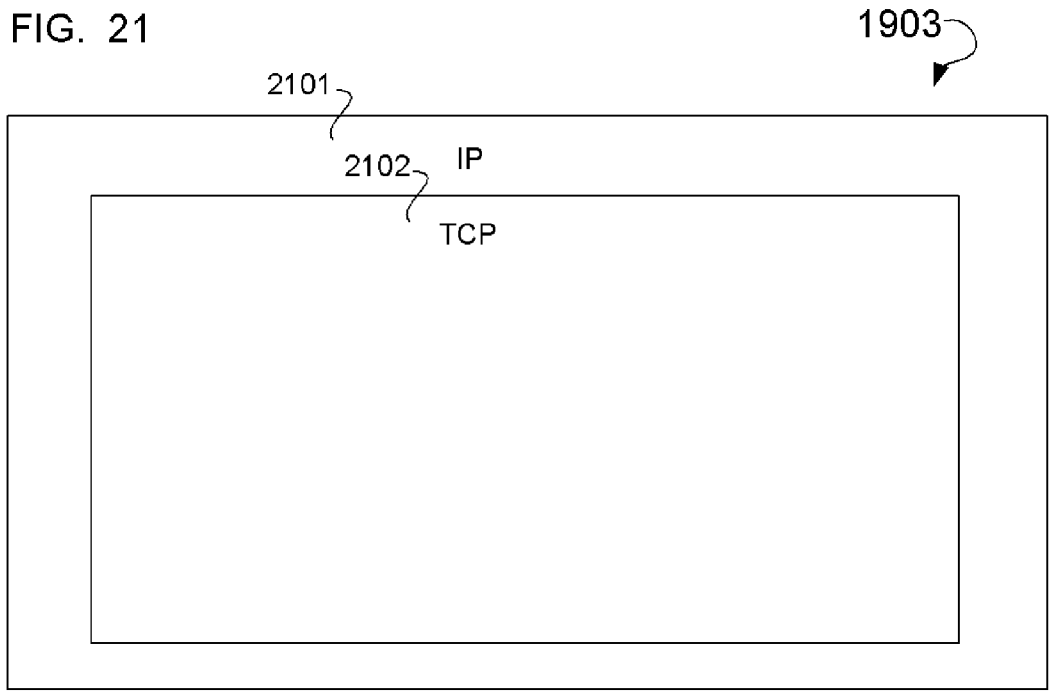
FIG. 21 is a diagram of a data packet, according to an example embodiment.

FIG. 21 is a diagram of an example data packet 2103. In some example embodiments the data packet 2103 is, for example, a TCP/IP based data packet where, for example, the data packet is wrapped within a TCP wrapper 2102. This TCP wrapper 2102 may, in turn, be wrapped within an IP wrapper 2101. This data packet 2103 is transmitted by, for example, the CE router 401, 501, 608-610, 701-703, 801-803, 901, 1001, 1101 or some other suitable network device such as a CE router or even in some cases a PE router.

FIG. 22 is a flowchart illustrating an example method 2200 used to perform a lookup of a destination address. Illustrated are various operations 2201-2203 that may reside on, for example, a PE router such as PE router 408 or 507. Shown is an operation 2201 that, when executed, receives a customer identifier that has been parsed from a data packet received by the PE router. This customer identifier is an IP address, a VLAN ID, or some other suitable uniquely identifying value. An operation 2202 is executed that performs a look-up of a customer identifier in, for example, an FIB associated with a VRFin table, or a VRFout table. An operation 2203 may also be executed that retrieves a destination address based upon the customer identifier. In certain example embodiments, a VLAN ID is used to look up a particular destination address such that while the VLAN ID may be uniquely identifying for the destination address, the destination addresses themselves may overlap such that a plurality of identical destination addresses may exist within the FIB 2204.

FIG. 23 is a diagram illustrating an example FIB 2204 and the various routing tables included therein. Shown is a routing table 2301, 2302 and 2303. Each one of these routing tables is divided in terms of a uniquely identifying customer ID value and a destination address, where the uniquely identifying customer ID value is unique, whereas the destination address may not be unique and hence may have overlap with other destination addresses. Specifically, as illustrated herein, the destination address 2304 included within the routing table 2301 is identical to the destination address 2305 included within the routing table 2302. Further, the destination address 2306 included within the routing table 2303 is identical to the destination addresses 2304 and 2305.

Figure 24:
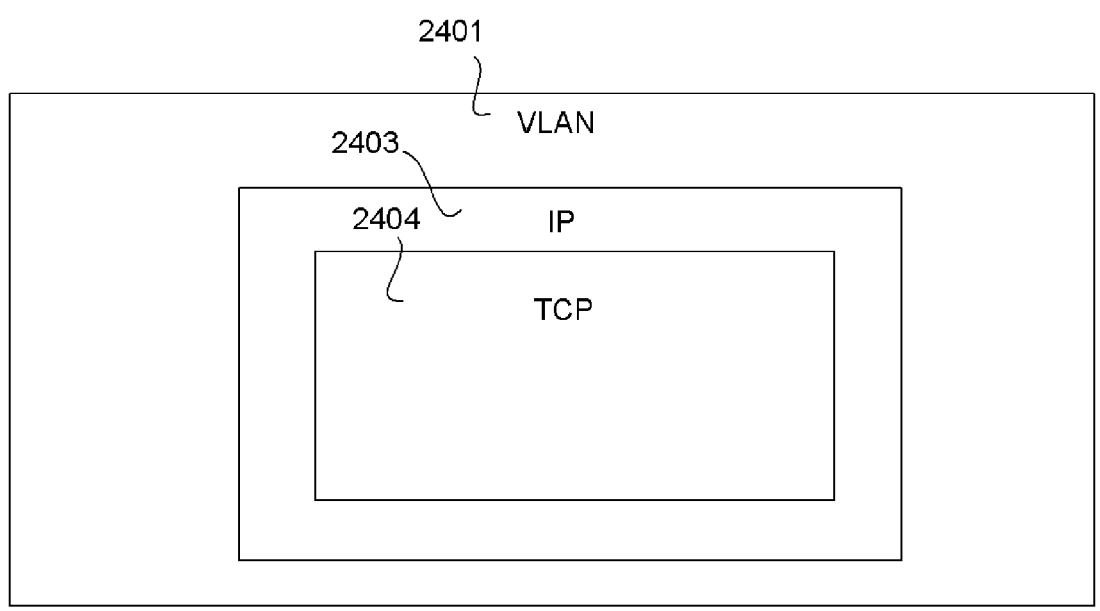
FIG. 24 is a diagram of a optimized customer specific data packet, according to an example embodiment.

FIG. 24 is a diagram of an example optimized customer specific data packet 1908. Shown is a VLAN header 2401 that is used to wrap, for example, an IP header 2403 which, in turn, is used to further wrap a TCP header 2404. In some example embodiments, the IP header 2403 and TCP header 2404 are used to make up the previously referenced data packets 1903, such that the VLAN header 2401, in effect, wraps the data packet 1903. In some example embodiments, a User Datagram Protocol (UDP) is used in lieu of TCP.

A System of Transmission Between a Server and Client

Some example embodiments may use the OSI basic reference model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as the Internet, LAN, WAN, or some other suitable network. In some example cases, Internet refers to a network of networks. These networks may use a variety of protocols for the exchange of data, including the aforementioned TCP/IP, and additionally ATM, SNA, SDI, Frame Relay, MPLS, or some other suitable protocol. These networks may be organized within a variety of topologies (e.g., a star topology) or structures.

A Computer System

Figure 25:
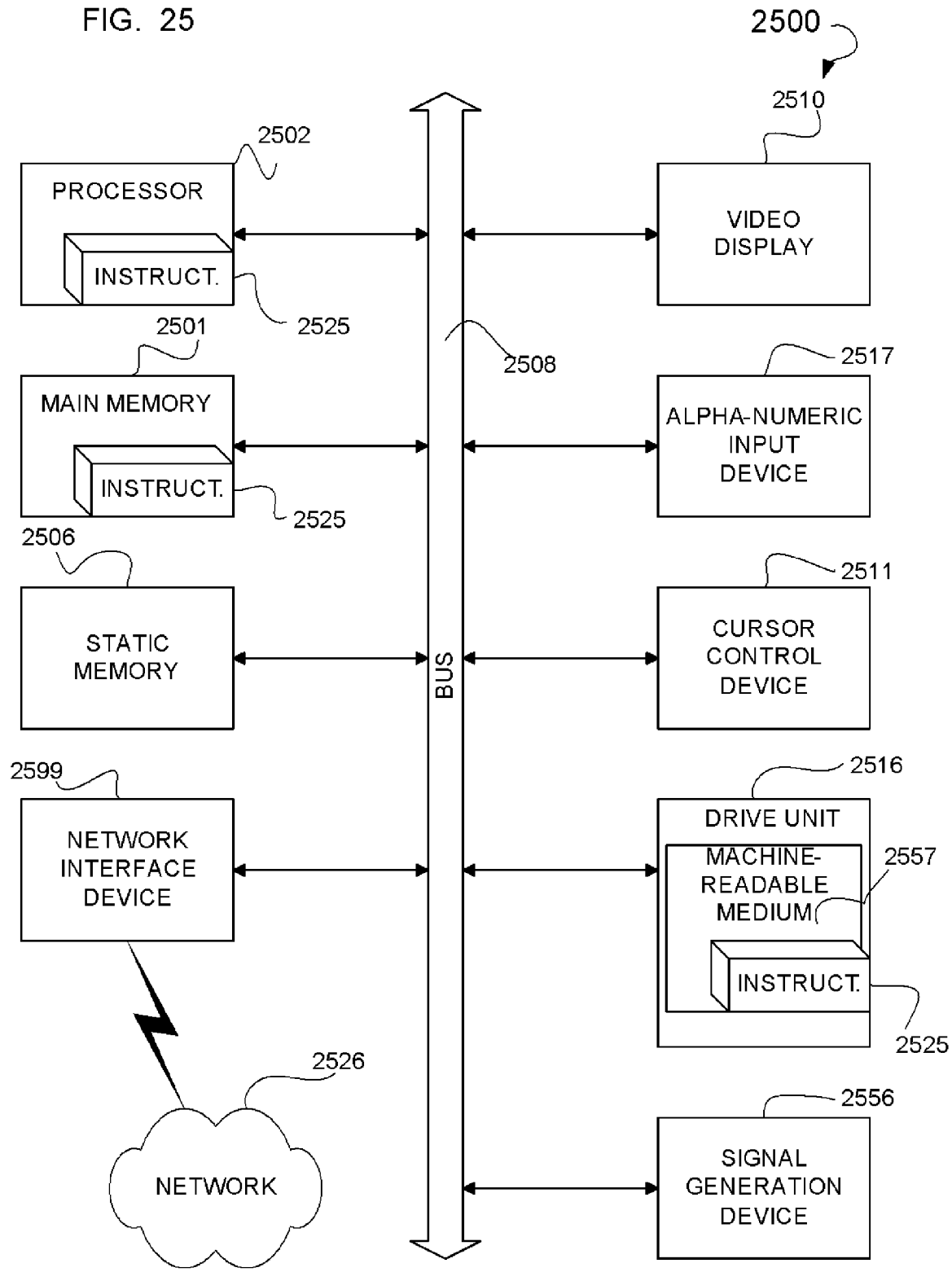
FIG. 25 shows a diagrammatic representation of a machine in the form of a computer system, according to an example embodiment.

FIG. 25 shows a diagrammatic representation of a machine in the example form of a computer system 2500 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, perform tasks. In a distributed system environment, program modules may be located in both local and remote memory-storage devices (see below).

The example computer system 2500 includes a processor 2502 (e.g., a CPU, a Graphics Processing Unit (GPU) or both), a main memory 2501 and a static memory 2506, which communicate with each other via a bus 2508. The computer system 2500 may further include a video display unit 2510 (e.g., a Liquid Crystal Display (LCD) or a Cathode Ray Tube (CRT)). The computer system 2500 also includes an alphanumeric input device 2517 (e.g., a keyboard), a User Interface (UI) cursor controller 2511 (e.g., a mouse), a disc drive unit 2516, a signal generation device 2556 (e.g., a speaker) and a network interface device (e.g., a transmitter) 2599.

The disc drive unit 2516 includes a machine-readable medium 2557 on which is stored one or more sets of instructions and data structures (e.g., software) embodying or utilized by any one or more of the methodologies or functions illustrated herein. The software may also reside, completely or at least partially, within the main memory 2501 and/or within the processor 2502 during execution thereof by the computer system 2500, the main memory 2501 and the processor 2502 also constituting machine-readable media.

The instructions 2525 may further be transmitted or received over a network 2526 via the network interface device 2599 using any one of a number of well-known transfer protocols (e.g., Hyper Text Transfer Protocol (HTTP), Session Initiation Protocol (SIP)).

In some example embodiments, a removable physical storage medium is shown to be a single medium, and the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, transaction accelerators are located remotely from the LANs that they serve, and are enabled to serve a plurality of customers and associated LANs. Virtualization of the computer system running the WAN optimization component of the transaction accelerator, and virtualization of certain network resources, allows for a single transaction accelerator to service multiple clients and their associated LANs. A single transaction accelerator can support multiple client LANs, such that a dedicated computer system need not be implemented to service a single client LAN.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   processing, at a device, a first data packet using a first operating system based on the first data packet having been received from a first network;
   processing, at the device, a second data packet using a second operating system based on the second data packet having been received from a second network;
   determining a route associated with the first data packet and the second data packet;
   parsing the first data packet into at least one first logical segment, and parsing the second data packet into at least one second logical segment;
   optimizing at least one of the first logical segment or the second logical segment, the optimizing including at least one of compressing, caching, or tunneling the at least one of the
   first logical segment or the second logical segment; and
   transmitting the first logical segment and the second logical segment as at least one data packet across a Wide Area Network (WAN).

2. The computer implemented method of claim 1, wherein the first operating system and second operating system are virtualized.

3. The computer implemented method of claim 1, wherein the first network and the second network are Local Area Networks (LANs).

4. The computer implemented method of claim 1, wherein the route includes at least one of a logical route or a physical route.

5. The computer implemented method of claim 1, further comprising associating a customer identifier with at least one of the first data packet, or the second data packet.

6. An apparatus comprising:
   a network appliance, configured to implement Virtual Routing and Forwarding (VRF), operatively connected to a WAN optimization device through a first physical interface;
   a first data store with a first VRF routing table, the first data store residing on the network appliance, the first VRF routing table comprising information to route, to the WAN optimization device, at least one data packet received at the network appliance from a Local Area Network (LAN), the WAN optimization device configured to optimize the at least one data packet, the optimizing including at least one of compressing, caching, or tunneling the at least one data
   packet; and a second data store with a second VRF routing table, the second data store residing on the network appliance, the second VRF routing table comprising information to route, over a WAN, at least one data packet received at the network appliance from the WAN optimization device.

7. The apparatus of claim 6, wherein the network appliance, configured to implement VRF, is operatively connected to the Wide Area Network (WAN) optimization device through a second physical interface.

8. The apparatus of claim 6, wherein the network appliance is configured to implement policy based routing.

9. The apparatus of claim 6, further comprising another network appliance operatively connected to the WAN optimization device through a second physical interface.

10. An apparatus comprising:
    a network appliance, configured to implement Virtual Routing and Forwarding (VRF), operatively connected to a Wide Area Network (WAN) optimization device through a physical interface;
    a plurality of first VRF data stores, each first VRF data store of the plurality of first VRF data stores including a single first VRF routing table comprising information to route, to a WAN optimization device, at least one data packet received at the network appliance from a Customer Edge (CE) router corresponding to the first VRF routing table, the WAN optimization device configured to optimize the at least one data packet, the optimizing including at least one of compressing, caching, or tunneling the at least one data packet; and a single common data store with a second VRF routing table comprising information to route, over a WAN, at least one data packet received at the network appliance from the WAN optimization device.

11. The apparatus of claim 10, wherein the physical interface is operatively connected to a 802.1Q trunk.

12. The apparatus of claim 10, further comprising a plurality of tunnels operatively connected to the WAN optimization device, each of the plurality of tunnels operatively connected to a Local Area Network (LAN) by a connection including at least one of a physical or logical connection.

13. The apparatus of claim 10, wherein the single common data store is a common logical data store.

14. The apparatus of claim 10, wherein the network appliance is a Provider Edge (PE) router.

15. An apparatus comprising:
    a network appliance, configured to implement Virtual Routing and Forwarding (VRF), operatively connected to a plurality of Wide Area Network (WAN) optimization devices through a plurality of first physical interfaces;
    a plurality of first VRF data stores, each first VRF data store, of the plurality of first VRF data stores, including a first VRF routing table comprising information to route, to the plurality of WAN optimization devices, at least one data packet received at the network appliance from a Customer Edge (CE) router corresponding to the first VRF routing table, the plurality of WAN optimization devices configured to optimize the at least one data packet, the optimizing including at least one of compressing, caching, or tunneling the at least one data packet; and a plurality of second VRF data stores, each second VRF data store, of the plurality of second VRF data stores, including a second VRF routing table corresponding to one of the first VRF routing tables, the second VRF routing table comprising information to route, over a WAN, at least one data packet received at the network appliance from the plurality of WAN optimization devices.

16. The apparatus of claim 15, wherein the network appliance and the plurality of WAN optimization devices are connected through a plurality of second physical interfaces.

17. The apparatus of claim 16, further comprising a second switch to manage the data packets received through the plurality of second physical interfaces.

18. The apparatus of claim 16, the plurality of first physical interfaces configured to route at least one data packet from the network appliance to the plurality of WAN optimization devices, the plurality of second physical interfaces configured to route at least one data packet from the plurality of WAN optimization devices to the network appliance.

19. The apparatus of claim 15, further comprising a first switch to manage data packets received through the plurality of first physical interfaces.

* * * * *